Jan. 31, 1967   T. R. NISBET   3,300,875
INSTRUCTIONAL APPARATUS
Filed Jan. 7, 1964   12 Sheets-Sheet 1
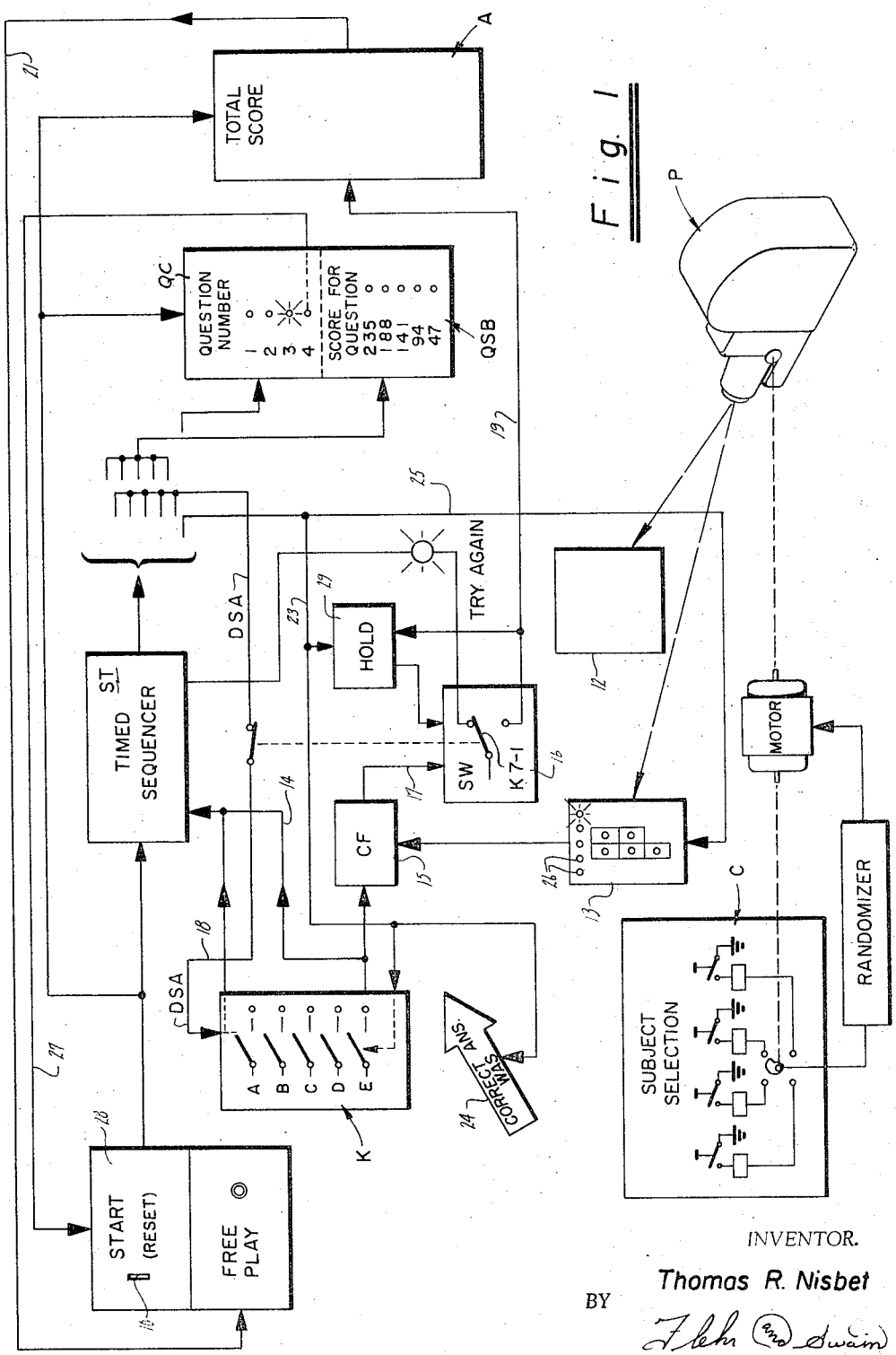
INVENTOR.
Thomas R. Nisbet
BY
Attorneys

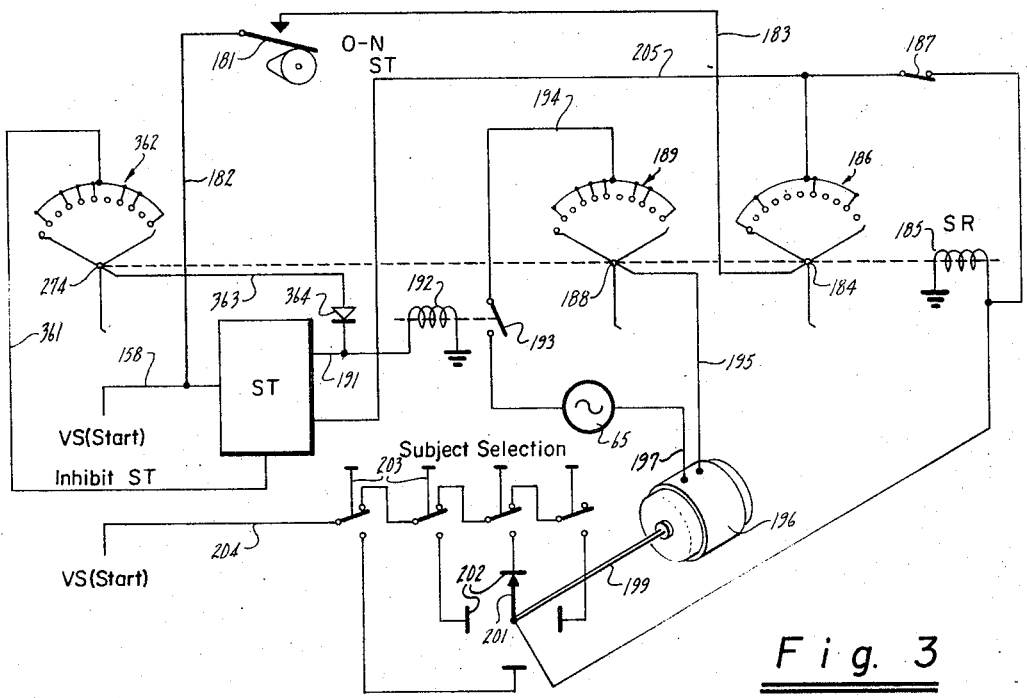
_Fig. 3_
| ST Time | | Function |
|---|---|---|
| 0,1 | — | Count Question |
| 2 | — | Frame Advance |
| 6 | — | Projector Lamp |
| 8 | — | Score Entry Time |
| 9 | — | DSA |
| 11,12 | — | Random Sel |
| 14 | — | Score Entry Time |
| 15 | — | DSA |
| 19 | — | Score Entry Time |
| 20 | — | DSA |
| 22 | — | Score Entry Time |
| 23 | — | DSA |
| 26 | — | Score Entry Time |
| 27-30 | — | Correct Answer Was |
| 31 | — | Extinguish Projector Lamp |
| 32 | — | Advance To Next Question (deenergize start relay) |
_Fig. 2_
INVENTOR.
Thomas R. Nisbet
BY
Attorneys

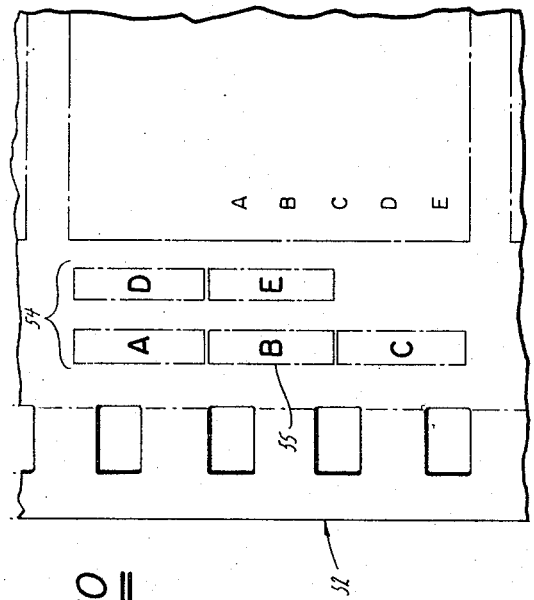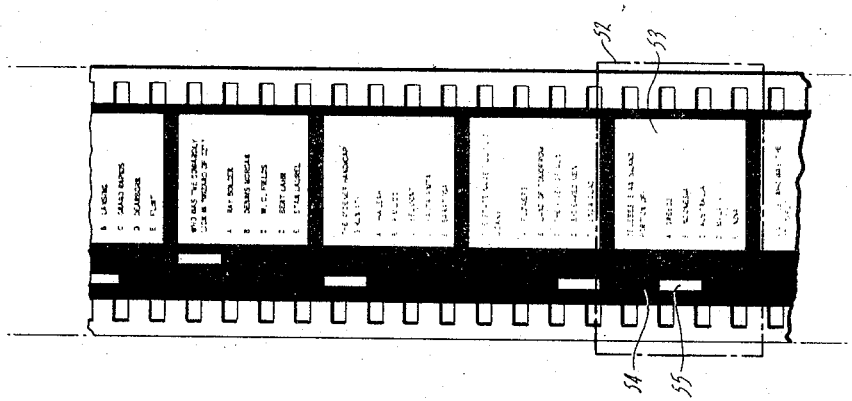

Jan. 31, 1967 T. R. NISBET 3,300,875
INSTRUCTIONAL APPARATUS
Filed Jan. 7, 1964 12 Sheets-Sheet 5
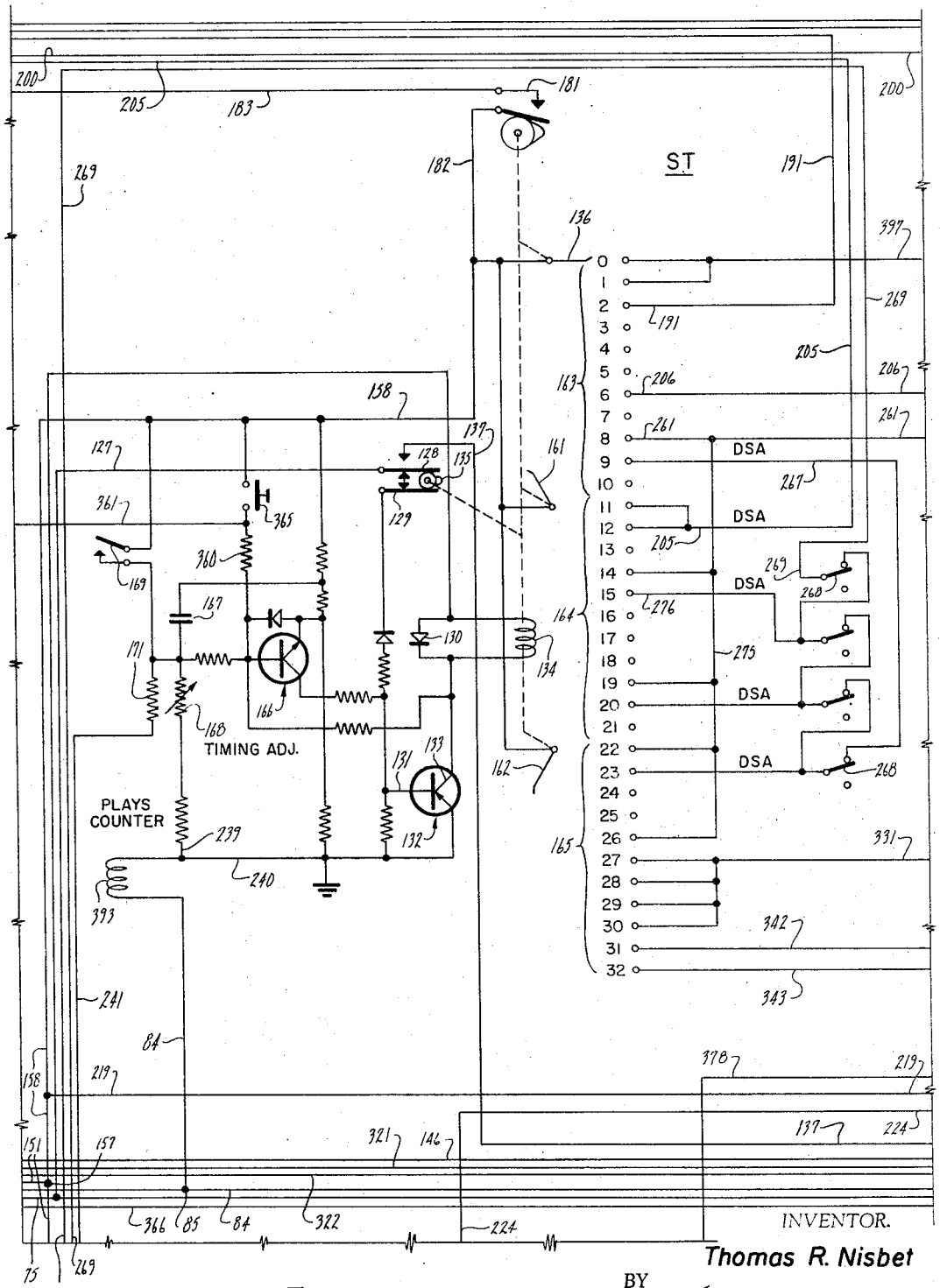
Fig. 4B
INVENTOR.
Thomas R. Nisbet
BY
Attorneys Jan. 31, 1967   T. R. NISBET   3,300,875
INSTRUCTIONAL APPARATUS
Filed Jan. 7, 1964   12 Sheets-Sheet 7

INVENTOR.
Thomas R. Nisbet
BY
Attorneys

Jan. 31, 1967

T. R. NISBET 3,300,875

INSTRUCTIONAL APPARATUS

Filed Jan. 7, 1964

INVENTOR.
Thomas R. Nisbet
BY
Attorneys

Jan. 31, 1967 T. R. NISBET 3,300,875
INSTRUCTIONAL APPARATUS
Filed Jan. 7, 1964 12 Sheets-Sheet 11

INVENTOR.
Thomas R. Nisbet
BY
Attorneys

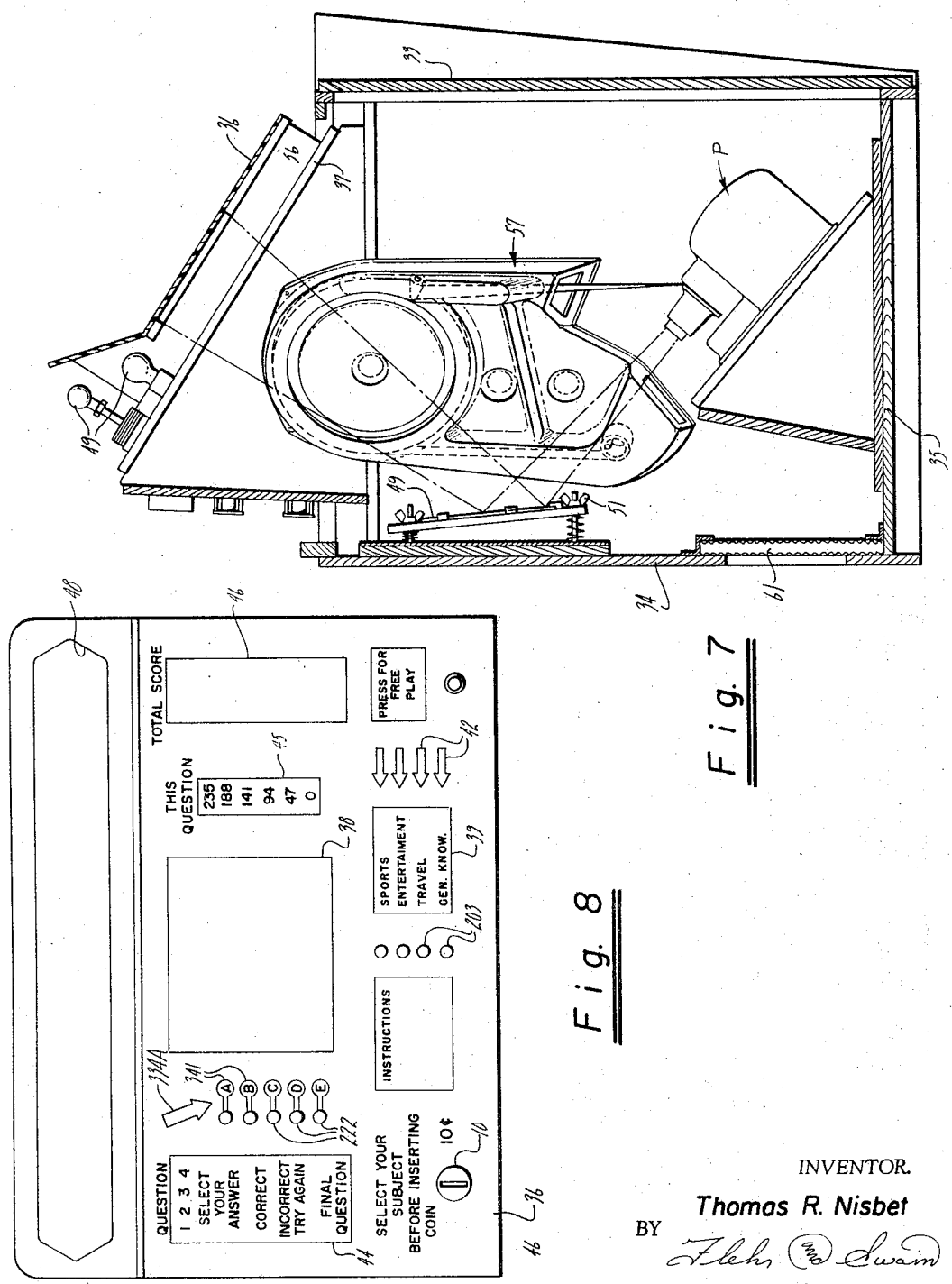

United States Patent Office 3,300,875
Patented Jan. 31, 1967

3,300,875
INSTRUCTIONAL APPARATUS
Thomas R. Nisbet, Palo Alto, Calif., assignor, by mesne assignments, to Edex Corporation, Mountain View, Calif., a corporation of Delaware
Filed Jan. 7, 1964, Ser. No. 336,274
7 Claims. (Cl. 35—9)

This invention relates to question and answer instructional apparatus and more particularly to such apparatus as is particularly useful as an entertainment machine. More particularly the apparatus pertains to that type of equipment wherein questions are presented to a player or student and responses are registered by him. Equipment of the foregoing style, where it has been provided, has been subject to a number of shortcomings and limitations which it is a general object of the present invention to overcome.

It is an object of the present invention to provide instructional apparatus wherein questions are asked and responses registered wherein a group or set of questions are randomly propounded in a non-recurring sequence.

Another object of the invention is to provide a question-answer apparatus employing an improved means for identifying and indicating the registration of a correct response by the player or student.

A further object of the invention is to provide means responsive to receipt by the equipment of a selected response whereby the cyclic operation of the equipment is momentarily speeded up until a subsequent time in the cycle of operation.

Yet another object of the invention is to provide means whereby a group of questions taken from one of several categories of subject matter is selected in a random sequence.

A still further object of the invention is the provision of means whereby a score is awarded for a correct response to the question propounded, the score being dependent upon and diminished by the elapsed time prior to registering a correct answer and the number of "tries" attempted.

An additional object of the invention is the provision of means whereby the registration of an incorrect response serves to reduce the available score remaining by a commensurate degree while permitting a predetermined number of additional attempts at registration of a correct response.

These and other objects of the invention will be more readily apparent from the following description of a preferred embodiment of a system according to the invention when taken in conjunction with the drawings in which:

FIGURE 1 is a schematic diagram of a system showing an entertainment machine according to the invention.

FIGURE 2 is a listing of the sequence of operation of a system according to FIGURE 1.

FIGURE 3 is a schematic diagram of a portion of the system shown in FIGURE 1. FIGURES 4A–4G comprise a detailed schematic electrical diagram of a control system for an entertainment machine according to the invention.

FIGURE 4 shows the relationship of FIGURES 4A–4G.

FIGURE 7 is a side elevation view along line 7—7 of FIGURE 5.

FIGURE 8 shows the layout of a console panel of the machine shown in FIGURES 5–7.

FIGURE 9 shows a portion of a length of film arranged and employed according to the invention.

FIGURE 10 is an enlarged portion of film with indicia markings designated thereon.

*General arrangement*

Figure 4A:
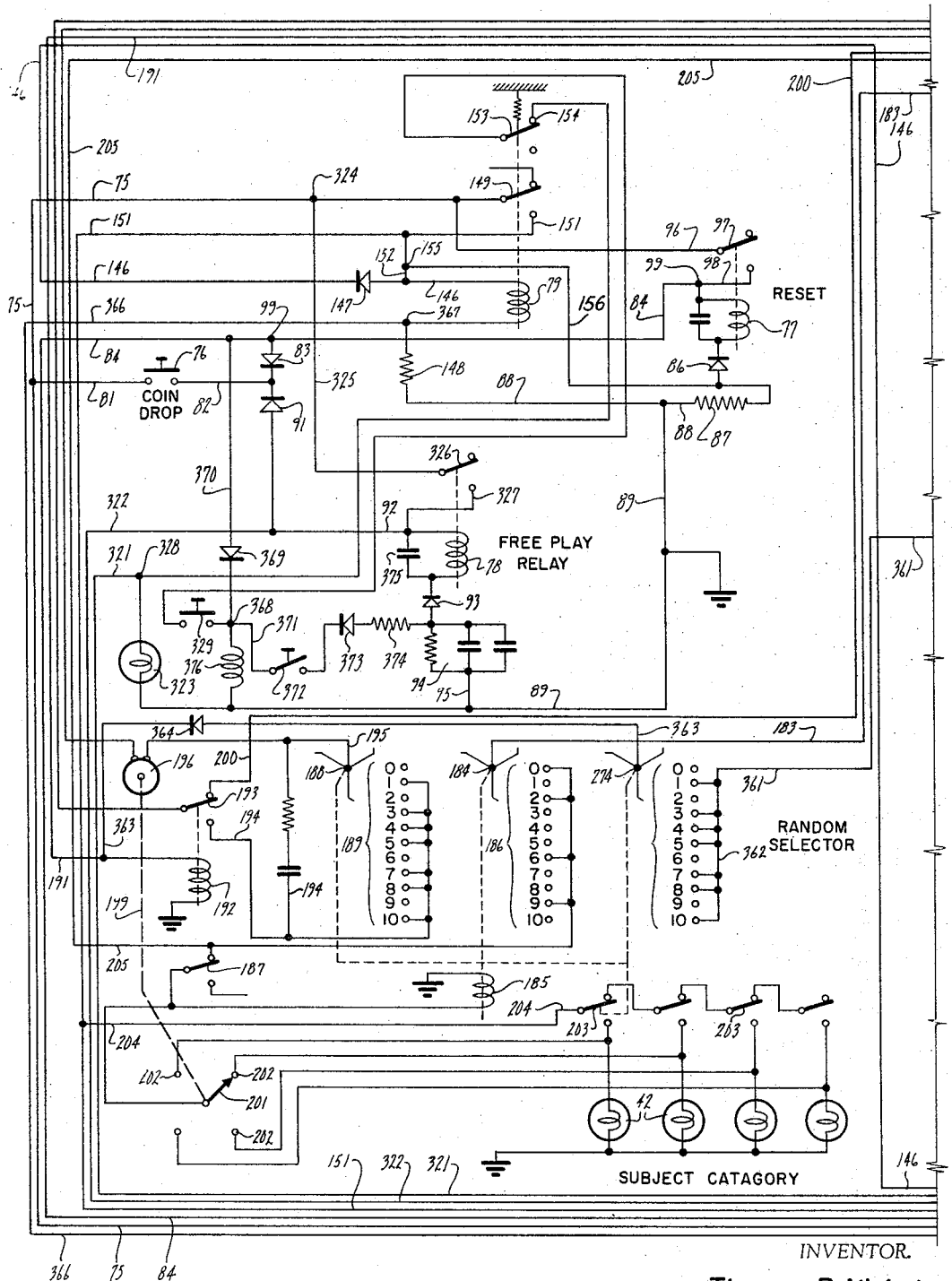
Figure 4C:
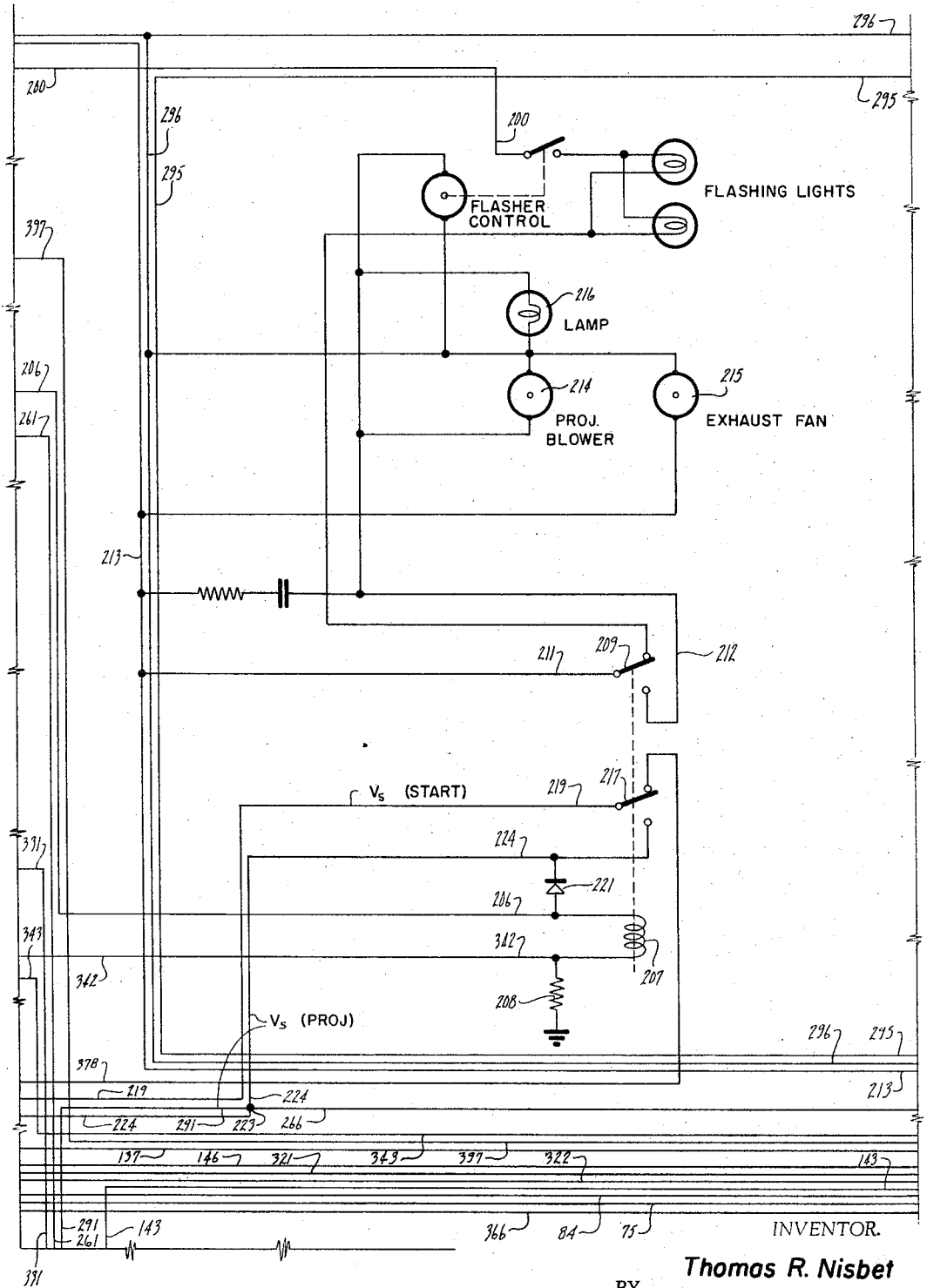

The general ararngement and operation of the over-all system is shown in FIGURE 1. A timed sequencer, in the form of a stepping switch in the preferred embodiment described further below is designated ST. ST serves to activate and de-activate various circuits and mechanisms to perform the functions according to a predetermined sequence at establishing time intervals as listed in FIGURE 2. Means for propounding one of a set of several questions to a player is provided in the form of a projector P. A response register for selectively receiving one of a plurality of responses entered by the player is shown in the form of a keyboard K. Projector P serves to present a random selection of a plurality of questions constituting a variable set of questions within one of several categories. Category selection is made by a category selection panel, C. The questions presented are counted and after a set has been completed the game is terminated. Indication of the number of the question is displayed on a question count display QC. As a score is obtained for each question, it is displayed on a question scoreboard QSB. The total score for a full set of questions is compiled and visually displayed by an accumulator A. When the accumulated score passes above a predetermined selected level of achievement, indication thereof is recognized and indicated by the award of a free play.

The general operation of the over-all apparatus commences with the insertion of a coin in an appropriate coin slot or other starting mechanism schematically represented by the slot 10 disposed at a convenient location in the equipment.

Insertion of the coin serves to reset the question scoreboard QSB, the timed sequencer ST, the accumulator scoreboard A, and operates a start relay to commence the presentation of questions to the player. The timed sequencer activates various means according to a predetermined sequence at established time intervals. For example, by referring to FIGURE 2 it is noted that the frame advance for the projector is activated whereby the first question to be propounded to the player is positioned for projection. Subsequently, at time ST 6, the projector lamp is lighted and a question is displayed upon a screen 12.

Each film frame has associated therewith a coded transparent region disposed to permit the projection of light onto one of five photoresponsive devices arranged in a panel 13 according to a predetermined configuration. Thus one of the group of photocells on the panels 13 is illuminated via the coded indicia space associated with the question being projected for viewing. The player makes his response by operating one of the five keys on keyboard K.

Upon receipt of a selected response to the question by the equipment, the timed sequencer is advanced at a quickened pace as by receipt of a signal on the line indicated as 14. The condition of keyboard K and the photocell panel 13 is compared by means indicated by box 15 and if the comparison shows an incorrect selection a switch means remains in position to transmit the signal back to the keyboard to re-condition it to delete or remove the previous selected answer. Thus, a delete selected answer signal (DSA) is applied to the keyboard, for example, on a line indicated as 18. At the same time the player is advised that he should try again. Prior to deleting the selected answer, however, the timed sequencer ST serves to reduce the points available for the question being propounded by advancing the question scoreboard QSB downwardly one step. Therefore, while a score of "235" points was available initially only 188 points is now available for a correct answer. Forty-seven ("47") points are equivalent to each of five steps. However, to achieve "188" for the particular question it must be promptly answered since the timed sequencer continues to run and at established time intervals will further reduce the number of points available for a correct answer by further advancing the question scoreboard QSB downwardly.

Assume that on the next try the player accurately selects a correct answer. The condition of keyboard K is compared by comparing means 15 with the condition of illumination of the photocell panel 13 and indication of comparison will cause switching means 16 to shift its condition thereby directing a signal on line 17 to a line 19 leading from switch means 16. As the condition of switch means 16 is shifted it is no longer possible for a delete selected answer signal to be applied to keyboard K. Furthermore, the question scoreboard QSB is deenergized whereby the score achieved for the particular question remains illuminated thereon. At the same time provision of a signal on line 19 enters the equivalent score into accumulator A whereby points for subsequent questions can be additively scored.

Where the comparing means 15 indicates the selection of a correct answer the switch means 16 also serves to inhibit the application of subsequent "delete selected answer" signals to keyboard K. Accordingly, the quickened pace of the timed sequencer continues until a predetermined time in the sequence pertaining to the question being answered. In the arrangement to be described further below, the quickened pace is maintained until the selected answer is determined to be incorrect, or if the selected answer was correct the quickened pace is maintained until a subsequent predetermined time in the sequence, for example, such as the portion of the sequence devoted to displaying what the correct answer should have been. Thus, where the player has made a correct selection early in the sequence and is ready to get on with the answering of a subsequent question he need not wait as long as the player who requires additional time to make a correct selection. On the other hand, the slower time interval has proven desirable for the period wherein the correct answer is being displayed. Therefore, as shown generally in FIGURE 1, a "hold" circuit 29 serves to maintain switch means 16 in a correct answer condition after receipt of a signal on line 31. Holding means 29 releases switch means 16 by the presence of a signal on line 23 during the time when the display of the correct answer is being presented.

After scoring has been completed for each question, and during the latter part of the timed sequence pertaining to each question, for example, at times ST 27–30, the correct response which should have been selected is displayed. This is represented by the five lights across the top of the photocell panel 13. Thus, the timed sequencer provides a signal along line 23 which serves to recondition the keyboard K and illuminate an indicator such as the arrow 24. At the same time, along line 25, ST conditions the photocells of panel 13 whereby light passing through the coded transparent region of the film frame, falls upon one of the photocells. This coded light pattern thereby causes the panel (while in its pre-conditioned state) to select one of the answer indicating lights 26.

Having advised the player of the correct answer, the next function performed by the time sequencer is to extinguish the projector lamp by circuit means (not shown). The question count score board QSB is advanced at the start of each sequence, at time ST zero, to indicate the next subsequent question. However, where the preceding question was the last question of the group being propounded, e.g., the last question of the game being played, an output signal is generated on an "end of game" line 27. Line 27 serves to terminate the game through control of a start relay arranged in a control section 28.

When the score in accumulator A exceeds a predetermined selected level, an output is indicated on line 21 whereby a free play is indicated and provided.

A complete detailed description of a preferred embodiment of the entire apparatus will be described further below. However, from the foregoing general description of the overall system it will be readily apparent that various subsystems have been incorporated herein, now to be generally mentioned.

Thus there is provided a subsystem, as shown in FIGURE 3, for propounding a random selection of a predetermined number of questions within a selected category.

Another subsystem provides means responsive to receipt of a selected response or answer to the question propounded and serves to quicken the pace of the timed sequencer until the selected answer is determined to be incorrect or a predetermined point in the cycle of the timed sequencer is established whichever first occurs. Note FIGURE 4. As shown in FIGURE 4, a subsystem is provided whereby answer selection, indication, scoring, and means serving to permit incorrect answers to be changed has been provided. Various other subsystems are included in the general scheme shown in FIGURE 1 and described in detail in the preferred embodiment further below.

In brief, then, there has been provided means for propounding one of a plurality of randomly selected questions to a player, a response register for selectively receiving one of a plurality of responses entered by the player, and means for indicating a correct response to the question propounded. Means serving to award a score for a correct response to the question propounded is also included. The score awarding means serves also to diminish the value of the score with increasing elapsed time as measured between the time of propounding the question and the indication of a correct answer. Further included there is means serving to selectively permit each registered response when determined to be incorrect to be changed a predetermined number of times with a commensurate reduction in the score whereby the score diminishes by both the number of attempted answers and the elapsed time prior to registering a correct answer. Finally it should be noted that means serving to activate each of the above means according to a predetermined sequence have been provided whereby the functions associated with each of the foregoing means is performed at established time intervals.

*Physical arrangement*

The general physical arrangement of the apparatus is shown best in FIGURES 5 through 10. A cabinet providing a frame 31 includes side walls 32, a front wall 33 such as a door providing access through the front of the machine and a back wall 34. Cabinet 31 is closed below by a bottom wall 35 and at the top by a console panel 36 overlying a flat component support member 37. Member 37 has a rectangular opening generally centrally thereof through which recorded images are projected onto a translucent screen 38 for viewing by a player. The layout of console panel 36 is shown best in FIGURE 8 and includes various display areas.

For example, a player will first want to select a category from the categories shown in area 39. This can be done by depressing one of the push buttons 203 associated therewith. Depressing push buttons 203 will light one of the arrows 42 indicating the category selected. Insertion of a coin in the coin slot 10 causes the apparatus to operate. A screen in area 38 receives a projected image from projector P in the form of a question together with a list of possible answers. An array of translucent push buttons 222 and lights associated therewith to indicate the depressed condition of any one of them is provided whereby a selected response to the question can be registered. During this time, if it is assumed that four questions are to be asked or any other number thereof constituting a set or group of questions (referred to herein as a "game"), the number of the question being asked is indicated by illumination of one of the four numerals in display area 44. Upon presentation of the question, a bulb 377 beneath a portion of area 44 marked "select your answer" is lighted. If the response which is registered by the player on push buttons 222 is correct this condition is so indicated by illuminating bulb 292 below a portion of area 44 wherein the word "correct" is displayed. Similarly if an incorrect response has been made, the incorrect and try again portion of area 44 is illuminated by a bulb 389 to advise the player to re-select another response to be registered on push buttons 222.

At the end of each question, arrow 334A lights up together with lights 341A–E to indicate which answer was correct. When the final question of the group being asked is presented on screen 38 this condition is likewise indicated in area 44 by illumination of the portion thereof identified by the phrase "final question" and also by illumination of the numeral 4.

Another display area 45 serves to indicate to a player the number of points which are available for a correct answer at a particular moment in time during the presentation of a question on screen 38. Early in the question period illumination is given to the number "235" which represents the maximum points which can be scored for a correct answer, if answered early enough. After a predetermined established time period the illumination is switched to the next lower number of points available, namely 188. When a correct answer is registered on push buttons 222, the most recently illuminated number on display area 45 remains illuminated and that score is entered into an accumulator and indicated on the display area 46. Thus the total score for all four questions is accumulated and shown at display area 46. When the number of points accumulated at display area 46 exceeds a predetermined level, a "free play" indication is provided by a bulb 323 beneath display area 47. Finally, the console panel includes an area designated 48, illuminated from beneath by flashing lights, for example 49 whereby advertising can be displayed.

As noted above, console panel 36 includes a translucent portion 38 serving as a viewing screen for displaying visual images in the form of questions and multiple choice answers. A portion of the film is shown in FIGURE 9. A projector P is supported at an inclined angle from the bottom 35 for projecting images to screen 38 via a mirror 49. Mirror 49 is adjustable about three mutually perpendicular axes by provision of three spring-loaded wing nuts 51. Projector P utilizes a question presenting medium in the form of a photographic film having a series of discrete portions thereof each bearing a recorded question associated therewith together with a plurality of possible responses to be registered. Thus, an endless length of photographic film is provided with discrete frame portions, 52. Each frame portion 52 includes a field portion 53 carrying a question recorded thereon and arranged to be projected for viewing on screen 38. Each frame portion 52 also includes an indicia portion 54 adjacent to field portion 53 serving to carry recorded indicia representing the correct response to a question carried in the field portion of the frame.

The indicia portion adjacent field 53 is generally opaque save for the presence of a transparent region disposed in one of five discrete positions as shown in FIGURE 10. By arranging the transparent region 55 in location B as shown in FIGURE 10, it is understood that the B answer to the associated question is a correct response. The entire frame 52 is projected onto mirror 49 but only the field portion reaches viewing screen 38.

Means serving to sense the indicia portion of each projected frame during presentation of a question on screen 38 and to detect the correct answer includes an array 56 of photoresponsive devices arranged to interpret the indicia and identify a correct response. Array 56 includes five photoresponsive devices such as photocells or photoresistors disposed to receive light in a comparable arrangement to the pattern of the transparent portions 55 as disposed in the indicia portion of each frame. As will be later evident from the further description which follows, comparing means are provided for comparing the condition of array 56 with a selected response registered by the player at keyboard K. The comparing means thereby detects or determines the registration of a correct player response.

Figure 6:
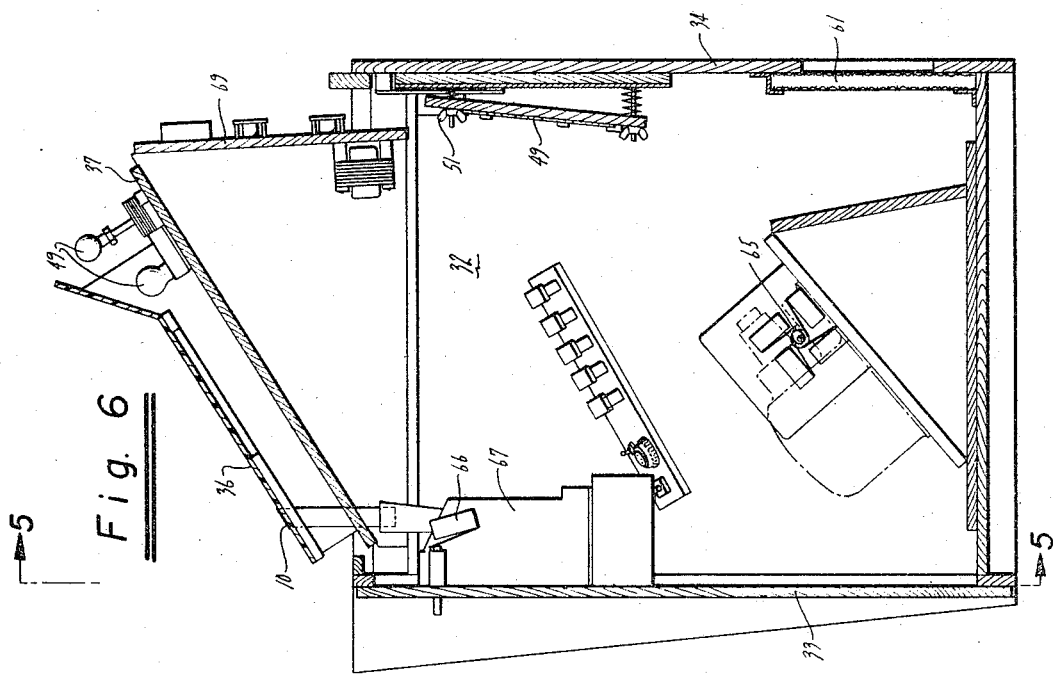
FIGURE 6 is a side elevation along line 6—6 of FIGURE 5 of a machine according to the invention.
Figure 5:
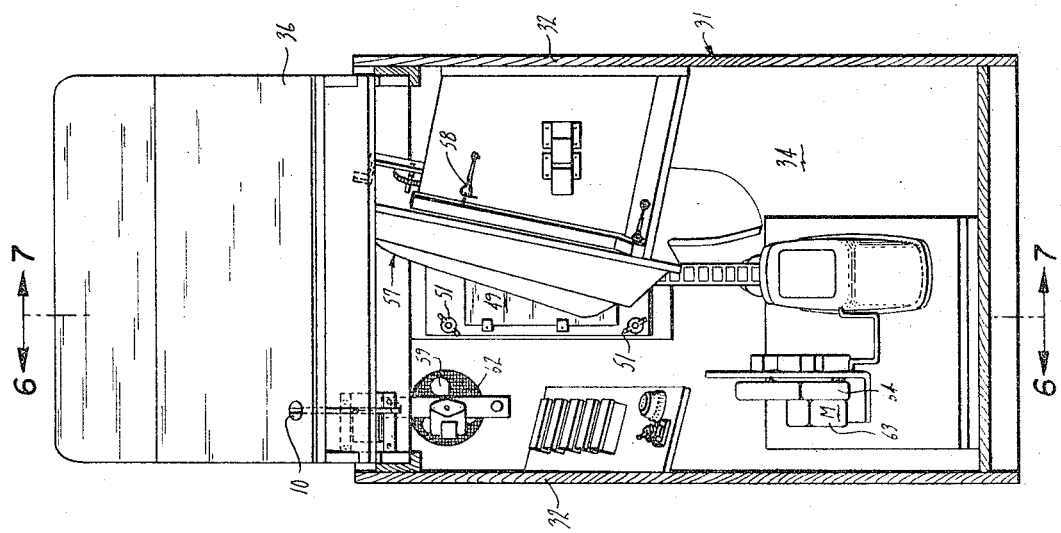
FIGURE 5 is a front elevation along line 5—5 of FIGURE 6 showing structure embodying the system schematically shown in FIGURE 1 according to the invention.

The balance of the physical equipment shown in FIGURES 5 through 7 includes a removable film canister 57 maintained in place by hooks 58 whereby a replacement reel of film can be easily mounted in the equipment. A blower is located inside the projector for cooling. An exhaust fan 59 serves to draw air from the surroundings into the cabinet via a filter 61 and exhaust the air through a screen-covered opening 62. The film medium is disposed to be advanced through the projector P and motive means in the form of a fractional horsepower motor 63 and gearing 64 serve to advance the medium via rotation of a spindle 65. Conventional coin return mechanism 66 is shown in FIGURE 6. A coin box 67 is disposed directly below a coin receiving chute 68. Finally a series of wiring panels 69 are supported at a convenient location to facilitate servicing and making suitable electrical interconnections. Stepping relays as will be further described are supported on the rear side of an upwardly extending support panel 69.

With the foregoing general comments in mind, a particular preferred embodiment according to the system can be described as shown in FIGURES 4A through 4G. In the embodiment to be described, stepping switches are employed to advantage for sequentially advancing certain of the various displays on the console panel. For example, the stepping switch for counting the questions and showing the score for each as displayed on QC and QSB in FIGURE 1, is identified in the wiring diagram as SQ. SQ will be referred to as the question count stepper. Another stepping switch identified as SS serves to advance the score in the accumulator A, as shown in FIGURE 1. Another stepping switch identified as SR is referred to as a random stepper for providing a nonrecurring sequence of questions within a selected category. The principal controlling element in the preferred embodiment to be described is the timed sequencer ST which serves to activate various functions according to a predetermined sequence at established times in each cycle of operation.

Each of the foregoing stepping switches is characterized by a plurality of banks of contacts and wipers associated with each bank. In certain instances the wipers are provided with a plurality of two or three arms and in certain instances only one arm is provided. The wiper arms of the stepping switches are disposed upon a rotatable axle or shaft which is advanced in discrete increments of rotary displacement by a solenoid or coil associated with a driving mechanism therein. It should be noted that the stepping switches employed in the particular embodiment described below serve to advance their shafts as the coil is deenergized as distinguished from that period of time when the coil is energized. Each shaft is further provided with a cam having one or more lobes which serves to operate so-called "off-normal" contacts at a predetermined point in the rotation of the shaft to make or break a circuit.

As the coil of each stepping switch is energized, a small armature or pole piece referred to as an interrupter is displaced in the manner of a solenoid armature thereby shifting one or more pairs of contact points from one condition to another. Usually, one pair "makes" and the other pair "breaks." The foregoing stepping switch arrangement can be readily supplied by moderate modifications to conventional stepping switch equipment as by removing selected arms of the three-armed wipers. Therefore, since it is a generally well-known structure, further description is not believed warranted.

With the above explanation in mind and when taken with the wiring diagram of FIGURES 4A through 4G the complete structure of a particular embodiment will be readily understood.

Therefore the operation of the equipment can be described commencing with plugging in the equipment to a source of power such as the 115 volt A.C. supply at 65.

Having a plugged in the main power supply at 65, 115 volts, A.C. is applied between leads 66 and 67 thereby energizing the primary 68 of a transformer 69.

The secondary 71 of transformer 69 includes a pair of diodes 72, 73 poled and arranged in push-pull relationship as a full wave rectifier whereby the secondary develops on the order of −30 volts D.C. A smoothing condenser 74 serves to even out the rectified output of transformer 69. The −30 volt output of transformer 69 appears on line 75 as a supply voltage VS (cont.) representing a continuously available supply voltage. This designation is entirely arbitrary as an aid in providing the following description wherein reference is made to a supply voltage identified as "VS (start)," and supply voltage "VS (proj.)" The former is applied to various conductors when the start relay 79 has been energized and held in that condition. The latter is applied to conductors after a projector relay 207 has been energized and held. As an aid in understanding the operation of the network to be described, the foregoing has been applied to a number of the conductors.

While the following description is based upon an entertainment machine where a coin is inserted and a group of four questions constituting a complete "game" are answered by a "player," it is to be understood that these terms are terms of convenience only; equipment of the kind described has equal application in educational machines and in marketing. Thus, where equipment of the kind described is utilized in educational machines the person operating the equipment can be a teacher or student. In market surveys one category of question can relate to certain products.

Depositing a coin into the equipment momentarily closes a switch 76. As switch 76 is closed both a reset relay 77 and a free play relay 78 become energized.

Energizing reset relay 77 serves to reset, in the following order, each of three stepping switches SQ (question count stepper), ST (timed sequencer) and SS (scoring stepper). After each of the three steppers has been reset, a start relay 79 is energized and maintained energized until the end of the "game" or set of four questions through a suitable holding circuit to be described further below. At that time, start relay 79 is deenergized via SQ.

*Timed sequencer, ST*

Before tracing these individual reset operations it is to be observed that the principal controlling element in the network is the timed sequencer ST. The timed sequencer comprises a transistor relaxation oscillator circuit arranged to drive a stepping switch. The stepping switch rotates through thirty-three positions for each question, and these positions serve to activate each of a number of elements to perform their assigned functions according to a predetermined sequence at established time intervals. Functions have been listed in association with their various times of performance in the table shown in FIGURE 2. Thus, at time ST 6, for example, the projector lamp is lighted. Among the various functions performed, the timed sequencer serves to advance frames on the projector. Then it turns on the projector lamp, then it scores points and in the event the selected answer was incorrect and another opportunity is to be afforded the player, the previously selected answer is "deleted" to permit a subsequent attempt. Then the timed sequencer indicates the correct answer whether or not it was selected by the player, and subsequently turns off the projector lamp. At the start of each question it advances the question count stepper to indicate the number of the next question to be presented. After three questions have been accounted for, the next question count finishes the play or game, giving a total of four questions per game.

The timed sequencer operates at a nominal rate of one step per second but as soon as an answer is selected as well as under other conditions, as will be noted, it speeds up to a nominal five steps per second in order to make optimum use of the time during play. Thus, if the player quickly selects the correct answer there is no reason why the next question should not be quickly presented. On the other hand, if the first attempted answer is incorrect the player would normally desire to have additional time in which to make a further attempt at achieving a correct answer. Thus the timed sequencer is arranged whereby under certain conditions the pace is quickened.

*Reset*

As the coin closes switch 76, relay 77 is energized. This circuit can be traced from the supply voltage VS (cont.) on line 75 to lead 81 through switch 76 to lead 82, then via diode 83 poled to pass the negative D.C. supply onto lead 84 and then through reset relay 77 and diode 86 similarly poled. From diode 86 the circuit is traced through load resistor 87 to leads 88, 89 and then to ground.

While it will be later explained, it might be well to note that the free play relay 78 is also energized by passage of a coin through switch 76. Thus, a minus supply voltage on line 82 passing via diode 91 to lead 92 serves to energize relay coil 78 and pass subsequently via diode 93 and the resistor of an RC network 94 to ground via leads 95, 89.

Energizing reset relay 77 serves to reset, in sequence, SQ, ST, and SS. Relay 77 is held energized until such time as start relay 79 is itself energized. The holding circuit for relay 77 is traced via leads 75, 96, holding armature 97 and lead 98 which connects to lead 85 and a subsequent path traced to ground via leads 88, 89 as previously described. By keeping the reset relay energized the supply voltage is fed out to reset SQ, ST, and SS.

To reset SQ, it is to be observed that the junction point 99 provides something on the order of −30 volts D.C. on line 84. Going leftward of point 99 line 84 carries supply voltage VS around to the question count stepper SQ via a junction point 101 to lead 102 and then through diode 103 and leads 104, 105, armature 106 of a question count driver relay 107, a lead 108, and via the coil 109 of question count stepper SQ to ground.

As soon as SQ coil 109 is energized, interrupter 111 shifts to take the VS from line 104 and direct it via line 112 to coil 107. It then passes through the resistor of an RC network 113 to ground. SQ steps quickly along. As coil 107 is energized its associated armature 106 shifts downwardly to deenergize SQ coil 109. The lower contact point 114 to which armature 106 is shifted is at this time an open circuit. However, as coil 109 is deenergized interrupter 111 shifts back to its open condition whereby question count driver coil 107 is deenergized. As it is deenergized, armature 106 returns to its original position in order to reenergize SQ coil 109. Thus, an oscillating movement is obtained which serves to mechanically advance the three wipers 115, 116 and 117 respectively associated with the first, second and third banks of SQ as designated 118, 119 and 120. This stepping action continues until off-normal contacts 122 are connected by action of cam lobe 123, angularly disposed upon its shaft to coincide with the zero or home position of wipers 115–117. At the time off-normal contacts 122 are closed, VS on line 104 is applied to energize coil 107 while by-passing coil 109. Coil 107 therefore remains energized and armature 106 remains at contact 114 thereby terminating the stepwise advance of SQ.

Suitable counting means, represented by a relay coil 393, are advanced one count when VS appears at junction point 85 on line 84. Thus, the number of plays of the machine can be recorded.

Timed sequencer ST is reset next. This action is initiated by closure of another off-normal contact point 124 under action of a cam lobe 125 rotationally synchronized with the previous cam lobe 123. Closure of off-normal contacts 124 serves to interconnect lines 126 and 127 to carry supply voltage from line 84 to the off-normal contactor arm 128. Arm 128 is connected to the interrupter contact point 129 disposed in the circuit of the base electrode 131 of a power transistor 132. Power transistor 132 is arranged whereby application of the supply voltage to base electrode serves to switch transistor 132 into conduction whereby current flows in the circuit of collector 133. A parallel circuit including diode 130 and a coil 134 of the stepping switch in ST is thereby energized. As coil 134 is energized, however, interrupter contacts 129 break to deenergize coil 134. This oscillation continues until off-normal contact 128 is opened by the action of the cam lobe 135. Lobe 135 is arranged to open contact 128 in coincidence with disposition of wiper 136 at a "reset" zero position.

Ordinarily, the timer does not need to be reset inasmuch as when it finishes a game it is normally so disposed. However, under certain circumstances, as where the power plug might have been inadvertently pulled out during a game, it is desirable to include provision of means for resetting the timer to a zero position in order to insure proper operation of the equipment.

Further description of the transistorized circuit for driving the stepping switch coil 134 of ST is described below. However, at this time it might be noted that in the particularly preferred embodiment being described, circuit values on the order of those shown in the drawing have been utilized successfully.

Having reset the timed sequencer to zero, means are provided whereby the stepping switch of the accumulator scoreboard is returned to show a zero score and this circuit can now be traced.

Briefly, to review a moment, it is to be recalled that reset relay coil 77 is being held energized by the armature 97 which serves to carry supply voltage to line 84. Line 84 is being interconnected by the off-normal contact 124 which serves to couple lines 84, 126 to 127. After resetting ST, line 127 is connected by action of lobe 135 and off-normal arm 128 to a line 137 which carries supply voltage to reset the scoring accumulator which is driven by scoring stepper, SS.

The coil of scoring stepper SS is identified by reference numeral 138 and is energized from line 137 via an off-normal armature 139, a diode 141 poled to pass the minus supply voltage through the interrupter contact 142 to the line 143 leading to coil 138 and subsequently to ground. As before, when the coil of the stepping switch is energized interrupter contact 142 is opened, thereby advancing the stepping switch one position during the deenergized period. As coil 138 is deenergized, interrupter contact point 142 returns to again complete the circuit and this procedure is repeated until cam lobe 144 serves to break the circuit at armature 139.

By this time it is to be noted that three stepping switches have been reset in sequence and in a manner whereby if any one of the resetting actions had failed the cycle would have stopped then and there. Resetting in this manner is a considerable aid in trouble shooting the equipment. It is further to be noted that this particular style of resetting is possible where the stepper moves when it is deenergized as distinguished from those stepping switches which move when they are energized.

*Initiation of stepping in ST*

The next step in the operation of the equipment is to get the timed sequencer started to move through a predetermined sequence of positions. This is accomplished by energizing the start relay 79, holding it energized, deenergizing the reset coil 77, and then applying supply voltage to the wipers in timed sequencer ST. The circuit for performing the foregoing can be traced from line 137 to off-normal armature 139 of SS which has been moved into contact with a contact point 145 thereby carrying supply voltage VS to line 146. VS on line 146 passes through a diode 147 appropriately poled and then to coil 79, through a resistance element 148 and to ground via lines 88, 89. As start coil 79 becomes energized a holding circuit is established by armature 149 which serves to connect VS (cont.) from line 75 to line 151, 152, 146, coil 79, resistance element 148, and subsequently to ground via lines 88, 89. At the same time a free play armature 153 is removed from contact 154 for purposes which are described further below in conjunction with functions performed at a later time in the cycle.

By establishing the start relay holding circuit through armature 149, supply voltage appears at a junction point 155 connecting line 152 to a line 156 thereby carrying supply voltage on the order of —30 volts to the anode side of diode 86 whereby the voltage drop across coil 77 is bucked out and the holding armature 97 is released to break the reset relay holding circuit.

With VS (start) on line 151 supply voltage is carried to timed sequencer ST via junction point 157, a line 158, and the wiper 136. With supply voltage applied to wiper 136 the first of the functions can be performed.

It should be noted in timed sequencer ST three wipers electrically in common are provided, 136, 161 and 162. Each of wipers 136, 161, 162 respectively sweeps an associated bank 163, 164 and 165 of contacts. The foregoing three wipers are rotationally displaced 120° whereby the electrical effect is to apply VS (start) from line 158 sequentially to each of thirty-three positions.

The circuit which serves as a timer for advancing wipers 136, 161, 162 at either a normal or a quickened interval is shown best in FIGURE 4B. The timer circuit basically is a two-transistor D.C. amplifier, wherein an NPN transistor 166 is D.C. coupled to a PNP power transistor 132. The load of stepper coil 134 is disposed in the collector circuit 133 of transistor 132. Substantially the full current of stepper coil 134 is conducted through transistor 132 and runs on the order of two amperes.

In operation either both transistors are conducting or both are non-conducting. When they are non-conducting stepper coil 134 is deenergized. A 500 microfarad capacitor 167 is slowly charged up by a variable resistor 168 having on the order of 1000 ohms. Charging up condenser 167 continues until the NPN transistor 166 is driven into conduction. When transistor 166 conducts it causes base current to flow in transistor 132 causing it likewise to conduct. As transistor 132 goes into conduction stepper coil 134 is energized thereby causing interrupter contacts 169 to close which in turn discharges condenser 167. With condenser 167 discharged, there is no base current in transistor 166 and therefore it stops conducting. As transistor 166 terminates conduction, transistor 132 follows suit. Thus coil 134 is again deenergized. This action releases interrupter contacts 169 and advances the wipers 136, 161, 162 one step. At the same time condenser 167 begins to charge up again and the cycle repeats itself at intervals of predetermined duration.

The charging rate of condenser 167 can be varied by adjusting the resistance of variable resistance element 168. Furthermore, by disposing another resistance 171 of a relatively low value in parallel with resistor 168, it is possible to reduce the duration of each timing interval a substantial amount and thereby quicken the advancing pace of the wipers. As will be noted further below, under certain circumstances resistor 171 is switched into shunt with resistor 168 for this purpose.

At several different times each "revolution" of ST, a portion of the random frame selecting function occurs. Therefore, before tracing circuitry for each function performed by advancing movement of time sequencer ST, the general manner of randomly selecting the four questions constituting the game or group to be answered will be generally described.

*Random frame selection*

For each question, the projector motor advances the film 1, 2 or 3 frames within a selected category and stops under control of certain randomizer means. The randomizer means (FIG. 3) includes a scanning sensor in series with the projector motor and is arranged to cyclically scan a series of motor operating contacts. These contacts are arranged in predetermined order, such as an arithmetic progression with a common difference of one. Each set of contacts representing a term of the progression is followed by an open circuit position to be sensed. Thus, the sensor can complete the projector motor circuit through 1, 2 or 3 successive contacts prior to moving to an open circuit position where the motor will be de-energized. A quick-acting brake means (not shown) on the projector stops the film advance abruptly upon sensing an open circuit position.

In order to select the next subsequent question at random, the randomizer is further arranged whereby once during each question the wiping sensor is moved cyclically through the series of contacts by means acting for an unpredictable period of time to dispose the sensor at a fresh starting point of the series. Thus, when it is time to advance the film (e.g., at time ST 2) the sensor will advance 1, 2 or 3 motor-operating positions before moving to an open circuit position to de-energize the motor and arrest the film's advance.

Film advance is synchronized with movement of the sensor through the progression of sensor positions whereby a related progression of frames within a selected category are advanced.

If, under action of the randomizer, the sensor were to land on an open circuit position, the film would not be advanced at all and the previous question would be repeated unless means were provided to insure an advance of the sensor by at least one position prior to each question.

Means are therefore provided for synchronizing sensor movement to provide a corresponding movement of the film whereby an equivalent number of question-bearing frames within a selected category are advanced. For example, if the sensor advances through two motor energizing positions before de-energizing the projector motor, two film frames within a selected category will be advanced. Thus, if it is assumed that four different categories of questions are to be carried on a film as shown in FIGURE 9 and if it is further assumed for sake of an example that the arithmetic progression of motor energizing positions is restricted to 1, 2 or 3 positions then the film will be advanced 4, 8 or 12 frames at film-advance time in the cycle of the timed sequencer, namely at time ST 2.

The arrangement generally referred to above, while found in the complete detailed description has been extracted from FIGURE 4 and is described in general by reference to FIGURE 3. As previously described, supply voltage identified as VS (Start) is applied to the timed sequencer ST as shown on a line 181. When timed sequencer ST is in its home position, the off normal contacts 181 serve to connect supply voltage VS (Start) from a line 182 to a line 183. Line 183 leads to one of a plurality of wipers 184 driven by random stepper SR identified by the coil 185.

If at time ST-Zero the bank 186 of contacts and one of the legs of wiper 184 provide a completed circuit to ground through coil 185 and the normally closed contact points of interrupter 187 of SR it signifies that the wiper 188 is at an open circuit position in bank 189. Bank 189 is arranged in the projector motor control circuit. Note that each of the open circuit positions of bank 189 corresponds to a closed-circuit position in bank 186 and vice versa. Thus, when the rotational disposition of wipers 184, 188 is interrogated, i.e., at time ST-Zero, coil 185 of random stepper SR is energized thereby opening interrupter contacts 187 to de-energize and accordingly advance the stepper SR. This movement serves to position one of the arms of wiper 188 at a motor-operating contact position in bank 189.

Later in the cycle of the timed sequencer, for example at time ST 2, supply voltage VS (start) is applied to a line 191 thereby serving to energize a projector frame advance relay coil 192. Energizing relay 192 serves to close switch 193 to operate the projector motor control circuit which includes a lead 194 leading to the contacts of bank 189, through one of the arms of wiper 188, a lead 195 connected thereto through the motor 196. Motor 196 drives the film of the projector. The circuit is completed from motor 196 back to switch 193 via lead 197 and an A.C. power supply identified as 65.

Means for moving motor-control wiper 188 step-wise through the progression of motor-operating positions until it arrives at an open circuit position includes the shaft 199 driven by the projector motor. A commutator 201 is carried on shaft 199 and scans each of four contact points 202. A plurality of manually controlled switches 203 is associated with each of the contact points 202 and when any one is depressed, supply voltage VS (Start) energizes coil 185 by a circuit traced from line 204 through the selected switch 203 and its associated contact point 202 in timed relation with each quarter revolution of shaft 199. Thus, if it is assumed that through suitable gearing arrangements one film frame is advanced for each quarter revolution, a pulse will energize coil 185 in synchronism with advancing movement of frames of film within a selected category. Each time coil 185 is deenergized the motor-control wiper 188 will advance one position. When wiper 188 has been advanced to an open circuit position, motor 196 is de-energized, and abruptly arrests the movement of the film.

As noted, with four categories of questions and as many as three motor-operating positions consecutively arranged, there can be up to twelve frames to be advanced through the projector before the randomly selected frame is in position for projection to the player. The duration of a timed interval of ST can readily be exceeded by the duration of the required film-advance.

Means serving to arrest the timed sequencer ST during advancing movement of the film is included in this system, in order to insure sufficient time to permit the selected frame to become positioned for projection before ST moves to the next function to be performed. ST is arrested by applying an inhibit signal from line 191, diode 364, wiper 274, bank 362 and an inhibit line 361 coupled to arrest operation of the transistor relaxation oscillator circuit which drives ST. The contacts of bank 362 are arranged to correspond to the motor-operating positions of bank 189. Contacts of bank 362 are scanned by wiper 274 synchronized with wiper 188 as it scans contacts of bank 189.

Thus any time that projector motor 196 is energized via bank 189, so also is timed sequencer ST, being arrested by application of the inhibit signal.

Later in the sequence of timed sequencer ST, for example at time ST 11, 12 the wiper sensor is moved cyclically through the series of contacts of bank 186 by means acting for an unpredictable period of time in order to dispose wiper 184 at a fresh starting point in the series of contacts. At time ST 11, 12 supply voltage VS (start) is applied to lead 205 to energize coil 185 through the normally closed interrupter contacts 187. Energizing coil 185 opens interrupter contacts 187 thereby producing a rapid oscillation between the two which serves to rapidly step wipers 184, 188 at a rate on the order of 60 steps per second. This stepping continues for a period on the order two seconds, i.e., two interval positions of timed sequencer ST. The exact duration of this rapid stepping movement is imprecise and gives an indeterminate and unpredictable advance to wiper 184. This can be attributed to the fact that the circuit is energized at slightly different times in the sixty cycle phase.

*Detailed system*

A detailed description of the performance of the various functions taken in sequence through each advancing movement of the timed sequencer ST, starting with wiper 136 disposed at time ST 2 proceeds as follows. This point in the sequence serves to apply supply voltage VS (start) to line 191 to operate projector motor 196 for 1, 2 or 3 question-bearing frames within a selected category as previously described. Where flashing lights on the display console are utilized to emphasize advertising, for example, energizing the projector motor to advance the film can serve to de-energize the flashing lights at that time if desired. Thus when switch 193 is pulled in by relay 192 a flashing light circuit via line 200 is de-energized. The flasher therefore goes off substantially at the beginning of the playing of the machine. The flasher may be a thermal device if desired or a motorized switch. As arranged in the circuit of FIGURES 4A–4G it picks up line voltage from the de-energized position of relay 193 and relay armature 209 of relay 207. If both of the latter two relays are de-energized then the circuit through the flasher is made and the flashing continues.

As noted, there can be up to twelve frames to be advanced through the projector before the randomly selected frame is in position for projection. Means serving to arrest timed sequencer ST during advancing movement of the film is included in the system, in order to insure sufficient time to permit the selected frame to become positioned for projection before ST moves to the next function to be performed. In order to arrest ST, at time ST 2 a substantial negative bias is applied to the base electrode of transistor 166. The circuit is traced via the resistor 360, lead 361, a bank 362 of contacts connected in common to lead 361. The contacts of bank 362 are arranged to correspond to the motor-operating positions of bank 189. Contacts of bank 362 are scanned by wiper 274 synchronized with wiper 188 as it scans contacts of bank 189. Wiper 274 connects to supply voltage VS via line 363, diode 364, and line 191. Thus, any time that projector motor 196 is energized via bank 189, timed sequencer ST is arrested by the increased negative bias on the base electrode of transistor 166 through a contact of bank 362.

For purposes of servicing the equipment, ST can also be selectively held by manually depressing push button 365. Suitable values for the unnumbered elements in the transistor oscillator circuit of ST have been shown in the drawings for a preferred embodiment thereof.

It is next desired to turn the projector lamp on. This occurs at time ST 6. With supply voltage applied to line 206 a circuit for energizing the projector lamp is traced to ground through a relay coil 207 and resistor 208. The projector lamp is operated by the A.C. circuits in the apparatus and accordingly as coil 207 is energized and its armature 209 interconnects leads 211, 212, the lead 211 carries A.C. from the circuit traced via conductor 213 through fuses and back to leads 66, 67. A.C. is applied to continuously energize the projector blower 214, the cabinet exhaust fan 215 and projector lamp 216 by connections between lines 213 and 296.

Inasmuch as wiper 136 of timed sequencer ST will not remain at line 206, a holding circuit for maintaining armature 209 in position to interconnect leads 211, 212 must be established. When coil 207 was energized an- other armature 217 was pulled in to bring supply voltage VS (start) from line 158 at junction point 218 along line 219 through the armature 217 and diode 221 thereby maintaining coil 207 energized.

With the projector lamp lighted, the question is displayed on the screen of the console panel and the player considers which of five possible answers is correct. When he has made up his mind his selection is registered in a response register such as keyboard K previously mentioned with respect to FIGURE 1.

*Answer selection*

It has previously been shown in detail how the questions are presented to the player. The following detailed description will demonstrate how the player's responses are registered. Upon completion of the detailed description it will be readily evident that there has been provided a response register for selectively registering one of a plurality of possible responses entered by the player. Means for interrogating the condition of the register and determining correct and incorrect player responses are provided as well as means serving to activate not only the means for presenting the questions but the means for interrogating the register according to a predetermined sequence at established time intervals. There will further be shown means serving to selectively permit an incorrect registered response to be changed a predetermined number of times as well as means responsive to registering a response and serving to temporarily reduce the duration of the established time intervals for a predetermined period of the timed sequence.

The keyboard K includes, as shown in FIGURE 4, five push buttons 222A–222E for selectively registering one of a plurality of possible responses.

Recall for a moment that at time ST 6 the projector lamp was lighted and a holding circuit established to maintain armature 217 of relay 207 closed. Accordingly, supply voltage will be applied via the junction point 223 to a line 224. This supply voltage will be referred to as VS (Proj.) wherever it appears in the drawing. This designation will serve to indicate that supply voltage is available on such lines so long as the holding circuit via armature 217 is maintained, i.e., until the projector lamp is extinguished at time ST 31.

Assume for the moment that the player selects as his response the answer designated "B." Push button 222B will be depressed momentarily. This energizes a relay coil K 6–2 through a circuit traced from the supply voltage on line 224 through an armature 225 to line 226. The circuit then proceeds through push button 222B and a lead 227, coil K 6–2, and a common line 228. Line 228 leads to ground through a diode 229, a timer speed-up relay K 6–6 and a resistor element 231.

Since push button 222B will be closed only momentarily, a holding circuit is established in shunt therewith through armature 232 and lead 233. The indicated selection is evidenced by illuminating a lamp 43B which is in a circuit leading to ground via lead 235, the upper armature member 236 of relay K 6–6, now in its lower position, junction point 237 and lead 238.

Upon having registered a response, energizing relay K 6–6 serves to temporarily reduce the duration of the established time intervals of the timed sequencer ST for a predetermined period of the sequence. This is accomplished by bringing resistor 171 of the timing circuit into parallel relation with the relatively larger adjustable resistor 168. Thus with reference to the timer control circuit it is noted that resistor 168 connects to ground via leads 239 and 240 whereas resistor 171 is connected to ground via line 241, the lower armature member 242, junction point 237, and lead 238.

*Correct answer determination*

As noted above, a coded arrangement of transparent indicia portions on each frame of film illuminates one of five photoresponsive devices during the time the projector lamp is lighted. These five photo devices correspond to the five possible answers to be selected and each is connected to a transistor for the double purpose of determining both whether a selected answer is correct or incorrect and of illuminating a lamp at the end of each question period to indicate the correct answer which should have been selected.

The means for determining correct and incorrect player responses includes a relay armature switch member 243A–E associated with each of the response register relay coils K 6–1 through K 6–5 respectively. These armature switch members are shown in response register K in position to be operated by their respective coils. However, their electrical operation is best understood, and they have therefore been carried over into the circuitry involving an array of photoresponsive devices such as the five photo cells 244 through 248. Thus, when coil K 6–2 was energized by push button 222B, an armature switch member 243B was moved to its lower position as shown. Where photo cell 245 is also illuminated by light passing through the indicia space associated with the film, movement of armature switch member 243B causes conduction of transistor 249B.

Each of transistors 249A through 249E includes emitter, base, and collector electrodes respectively 251, 252 and 253. Transistors 249 are disclosed between a pair of common lines 254, 255, the former carrying supply voltage VS (start), and the latter being at ground potential. It is to be observed that each base electrode is biased to a potential level lying between supply voltage and ground. When light falls upon the photo cell, as for example on 245, it has the electrical effect of substantially reducing impedance of the photo cell whereby the potential level on the base electrode is moved substantially closer to the supply voltage than to ground. Each emitter is biased by a line 256 which carries a potential on the order of (−) 3 volts by virtue of the voltage divider network comprising resistors 257, 258, 250. Each collector electrode 253 can be selectively connected via armature switch members 243 to line 254 via coil K 7–1 and interrupter contactor 279, to cause conduction in its associated transistor only if the base of that transistor is biased close to the minus V potential on line 254. The −V potential is on the order of −10 volts due to the voltage dividing action of resistors 250, 258 and 257. The base electrode is therefore biased substantially to −V potential when the associated cell is illuminated. Conduction is effected in a transistor 249 upon coincidence between the response registered and the illumination of an associated photo cell. Conduction of any of the transistors causes a current to flow in coil K 7–1. However, for the moment it is being assumed that the answer is incorrect and there was no such coincidence.

*Delete selected answer with question value diminished*

Since the answer was incorrect the player will desire to change his previous response. Means are provided which serve to selectively permit the registered response when incorrect to be changed a predetermined number of times. There is however a commensurate reduction in the score which he can obtain. The score, therefore, diminishes by having to change from an incorrect answer to a correct answer. The player will also desire a slower action of the timer. It therefore reverts to a normal pace. Obviously, if his answer had been correct he would desire to have the timer get on with the presentation of the next subsequent question.

When wiper 136 arrives at time ST 8 supply voltage is carried to lead 261 where it serves to score points if the answer was correct as will be described further below, or to diminish the score available for the particular question if the answer is incorrect.

In the latter event the question count stepper SQ is advanced one position by the application of supply voltage from line 261 through a circuit which includes the armature 262 of relay K 7–1 in its de-energized position. There it connects to lead 263 to energize question count driver relay 107 through diode 264. As coil 107 is energized, armature 106 is coupled to contact 114 whereby supply voltage on line 263 is applied via junction point 265 to stepper coil 109. Coil 109 becomes energized. Movement of interrupter contact 111 is ineffectual since line 104 is, at this time, a dead line. Thus coil 109 stays energized until timed sequencer ST advances wiper 136 to the next subsequent position.

At that time de-energization of coil 109 serves to advance each of wipers 115–117 one position. Accordingly, with supply voltage VS (Proj.) on line 266 leading to wiper 115 the lamp representing a score of 188 points for the question is illuminated. Wiper 116 moves one step but continues to illuminate the lamp advising the player that the question being answered is question number one. Wiper 117 is rotationally disposed with respect to the position of wiper 116 whereby it has not yet made contact with any of its associated contacts in bank 120.

Having thus reduced the score available for this particular question the player now has his prior answer deleted, at time ST 9. VS (start) is applied to line 267 through a selected plurality of series-connected switches 268 each of which is selectively positionable to make or break the circuit, a selected number of DSA signals can be employed for a given question. Assuming that it is desired to permit a previously registered response to be changed at least once, supply voltage (representing a delete selected answer signal, DSA) is carried to line 269, through the upper armature member 271 of a relay K 7–2. K 7–2 is energized, by a circuit to be described, whenever a correct answer has been selected. Thus, with an incorrect answer, it is in its de-energized position whereby line 269 is connected to line 272 to carry supply voltage to junction point 273 thereby "bucking out" the previously energized relay K 6–6. De-energizing relay K 6–6 serves to release armature 236 to extinguish the previously lighted lamp 43B and also to disconnect from ground (via line 241) the shunting resistor 171 in the timed sequencer circuit.

It can now be noted that earlier in the sequence of ST, immediately following the reset operation, when supply voltage VS (Start) comes on, lamp 377 is conditioned whereby upon projection of the question, the player will be advised to select his answer. This preconditioning circuit is traced from VS (Start) line 151, junction 157, line 158, junction 218, line 219, armature 217, line 378, coil K 6–7, line 279, junction 237, and line 238 to ground. Energizing coil K 6–7 serves to move armature member 381 to contact point 382 whereby at time ST 6 coil 207 causes VS (proj) to be applied to line 224 as described above and thereby light lamp 377 via line 391, resistor 392, and line 238 to ground. At this time all selected answer coils K 6–1 through K 6–5 are deenergized and their associated armature members are disposed to hold the coil K 6–7 energized via a circuit including line 383, armature member 381, contact point 382, junction point 384, diode 385, line 378, coil K 6–7, and lines 379, 238 to ground.

Means for introducing a momentary retention of current in K 6–7 during the moment (at time ST 6) that armature 217 is being shifted, is provided in the form of a condenser 386. Condenser 386 becomes sufficiently charged during the period that VS (Start) is energizing K 6–7 that when armature 217 shifts, enough current will discharge through coil K 6–7 to maintain it energized until the holding circuit is established through diode 385 from line 224.

Where it is assumed that the first selection made by the player is incorrect, and a delete selected answer signal (DSA) has been effective in de-energizing K 6–6 to release all the answer selection relays K 6–1 through K 6–5, supply voltage VS (proj) will again be applied to line 383 and armature 381. However, armature 381 is now in its de-energized position and disposed at contact 387 whereby lamp 389 is energized via line 388 to advise the player to "try again."

Completion of the foregoing circuit is made via line 391, resistor 392, junction 237, and line 238 to ground.

*Randomizing*

As explained above, once during each question, e.g., at ST 11, 12, the randomizing means will be reset to a fresh and unpredictable starting position. This has been explained above. Recall, however, that by this time in the predetermined sequence of ST, wiper 161 will pick up where wiper 136 left off. At time ST 11 VS (start) is carried to line 205 to start the buzzing action between coil 185 and interrupter contact 187. Recall further that wiper 184 as well as wiper 188 and wiper 274 are given a rapid advance. The duration of this advance is approximately two seconds as determined by the two intervals of time ST 11 and ST 12, but the period is imprecise and is not accurately predictable. If an answer is entered into selection register KB by time ST 11, the duration of advance may be on the order of 0.4 sec.

During the period between time ST 9 and ST 14 the player can be making up his mind as to a subsequent response to be made. Assuming however that the player has not entered a response by time ST 14, the application of supply voltage to line 261 via the common line 275 serves to further diminish the score available for the question by advancing wiper 115 to the next subsequent position.

This function is performed by the same circuit which was previously established and described back at time ST 8. Recall that in the event that a selected answer is attempted and is incorrect a delete selected answer signal is applied to a line 276 at time ST 15. The foregoing procedure is repeated again at time ST 20 as well as at time ST 23.

*Correct answer indication and points per question*

Assuming that a correct answer has been registered by time ST 19, the achievement of a correct response is indicated by means to be described and points are awarded and entered into an accumulator A. Furthermore, the points scored which are attributable to the particular question are indicated by arresting wiper 115 of SQ.

At time ST 19 supply voltage VS (Start) is applied via line 275 to line 261. It has been shown above how supply voltage VS (Start) applied to line 261 serves to advance the question count stepper by way of line 263 where the answer selected by the player is incorrect. It will be recalled that this is effected through the relay armature 262 in its de-energized position. Where the correct answer has been selected, however, armature 262 is in its energized position under action of coil K 7–1, now energized, whereby it connects to line 143.

K 7–1 becomes energized in response to the conjoint depression of a push button 222 and illumination of a related photoresponsive device 244–248 through the transparent coded indicia space disposed adjacent each frame of film. For example, assume that push button 222C represents a correct response to the question presented. Photo cell 246 will be illuminated and armature switch member 243C will be disposed to connect collector electrode 253C of PNP transistor 249C to line 259.

Biasing conditions at this time include a voltage, —v., on line 254 on the order of minus ten volts due to the voltage drop across resistor 250. A potential on the order of minus three volts is carried on line 256 to the emitter electrode. In its dark condition base electrode 252C is at a potential on the order of minus three-quarters volt. Collector electrode, via member 243C and line 259, receives a voltage on the order of —30 v., applied through coil K 7–1, lead 278, interruptor contact 279 associated with question count stepper SQ (i.e., coil 109), leads 279, 254, and 158 which carries supply voltage, VS (start).

By illuminating correct answer photo cell 246, potential on base electrode 252C changes to a value approaching the minus ten volts on line 254 whereby conduction in transistor 249C is effected to draw current in the collector circuit through coil K 7–1. As K 7–1 pulls in armature member 262, a bell or gong 277 is sounded and supply voltage passes via line 143 to a coil 138 of a scoring stepping switch, SS advancing accumulator, A.

For entry of a score into accumulator, A, the operation of coil 138 serves to advance a pair of rotationally displaced wipers 281, 282 one step at a time upon receipt of a VS (start) signal from timed sequencer ST at times ST 19, ST 22, and ST 26. Thus wipers 281, 282 of accumulator, A, are advanced three positions representative of 141 points. A score of 47 points has been arbitrarily selected (for reasons to be described further below) as equivalent to each stepping switch position.

Having made a correct answer, means are provided whereby the selected answer is not deleted. The timed sequencer ST is permitted to continue running at a quickened pace until a predetermined point in the cycle thereof, for example at time ST 27.

When K 7–1 became energized to indicate a correct answer a "you are correct" relay K 7–2 also became energized through a circuit traced from lead 261, armature member 262, junction point 283, lead 284, diode 285, poled to pass VS (start), lead 286 and relay K 7–2.

By energizing relay K 7–2 its associated armature member 271 is pulled in and serves to open-circuit the connection between line 269 and 272 which otherwise would have "bucked out" K 6–6 of the response register serving to slow down the timer and delete the selected answer. Thus, the signal is inhibited by the correct answer registering.

A circuit for holding coil K 7–2 energized until a subsequent time in the sequence of ST and also for giving visual indication that the answer selected was correct is provided. It can be traced from the ground side of relay K 7–2 through diode 287, lead 288 the armature member 289 of K 7–2, conductor 291 carying VS (proj) from junction point 223, line 224 and the holding armature 217 of relay 207.

Means for visually acknowledging selection of a correct answer is provided by the lamp 292 disposed in line 288. Lamp 292 becomes illuminated upon closure of armature member 289. Thus, lamp 292 and diode 287 are in parallel with K 7–2.

In the selection of a correct answer as distinguished from one which is incorect, an ambiguous circumstance could occur if the selection is made during times ST 8, 14, 19, 22, and 26. Recall that during these times points will be scored if a correct answer has previously been registered. Otherwise the points available for the question will be commensurately reduced. With reference to the photo cell panel, in a "selected" condition, the collector electrode of the selected transistor 249 is coupled to line 259. Line 259 carries supply voltage, VS, via relay coil K 7–1, line 278, interrupter contacts 279 of question count stepper SQ, and line 280. Line 280 as noted is at VS from line 254.

Interrupter contacts 279 serve to prevent entry of inaccurate scores. For example, assume for the moment, that interrupter contacts have been omitted. Recall that the steppers advance upon de-energizing their respective coils. Recall also that at times ST 8, 14, 19, 22, and 26, coil 109 of SQ will be energized if no answer or an incorrect answer has been registered. If the player makes a correct selection during the above identified times, points would be scored via an energized K 7–1 becoming de-energized. Upon their entry into accumulator A, SQ would also take one more step and then stop as coil 109 became de-energized. The score shown as achieved for the particular question would therefore be indicated at one level below the number of points actually entered into the accumulator scoreboard A.

Score accumulation

Figure 4D:
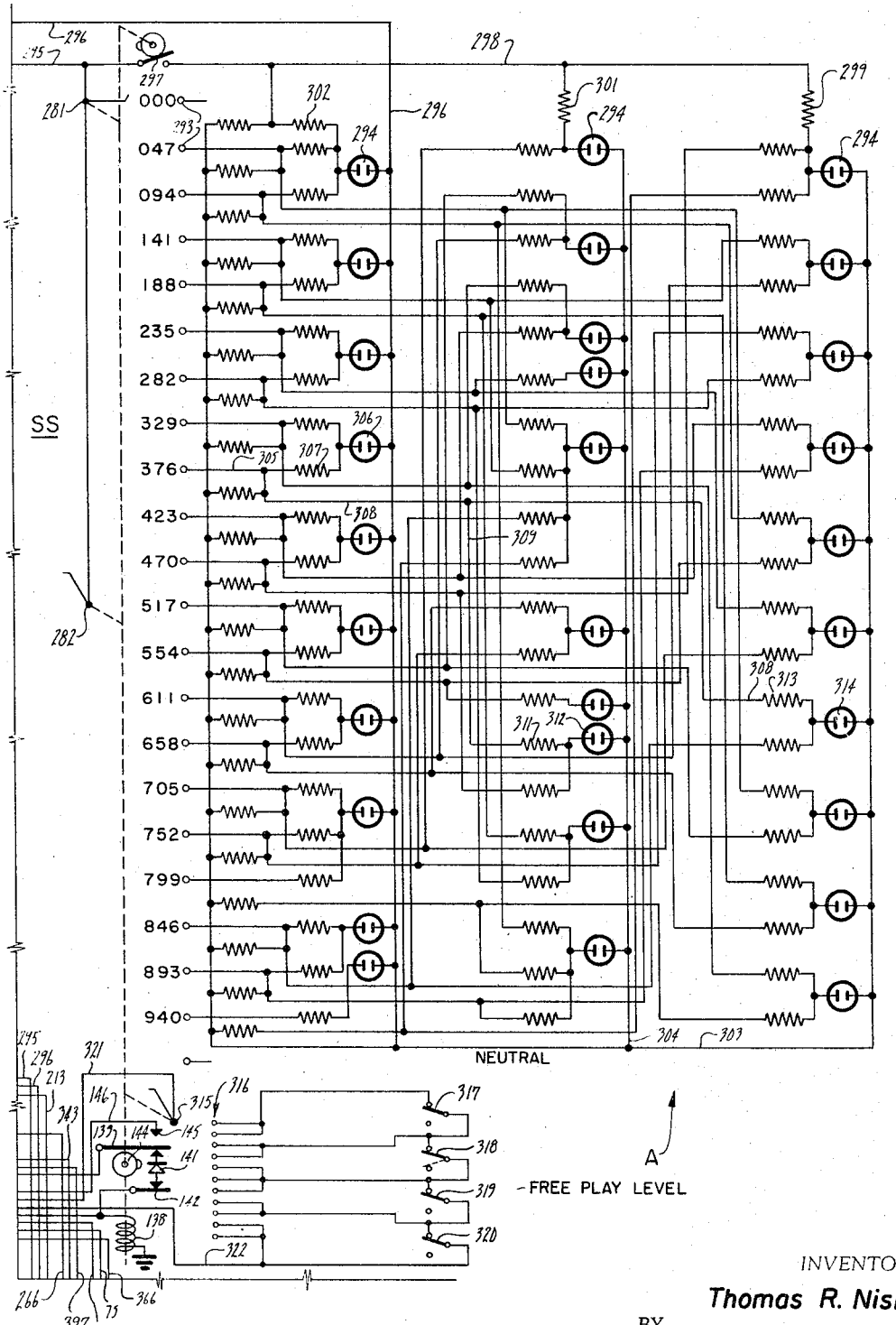
Figure 4E:
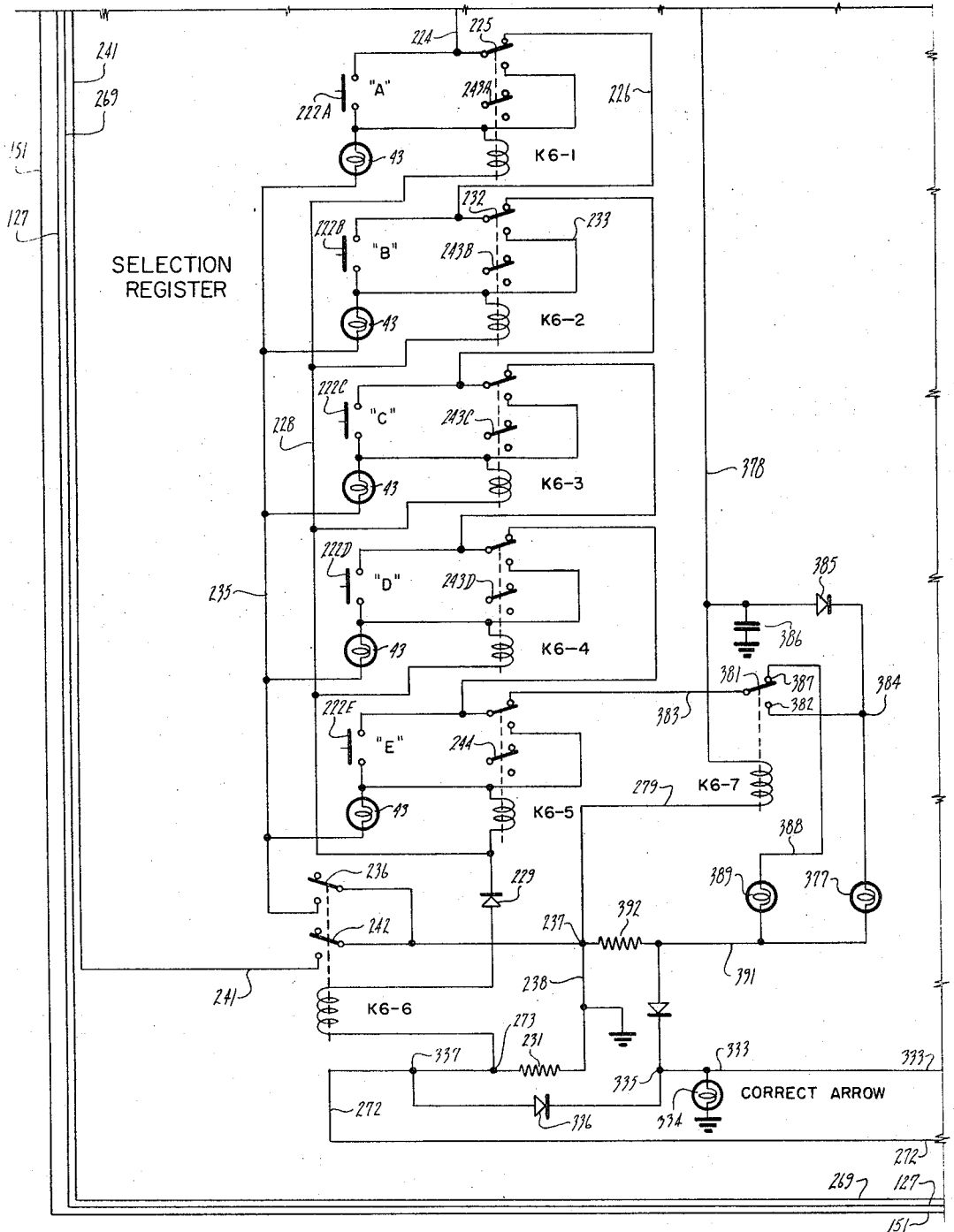
Figure 4F:
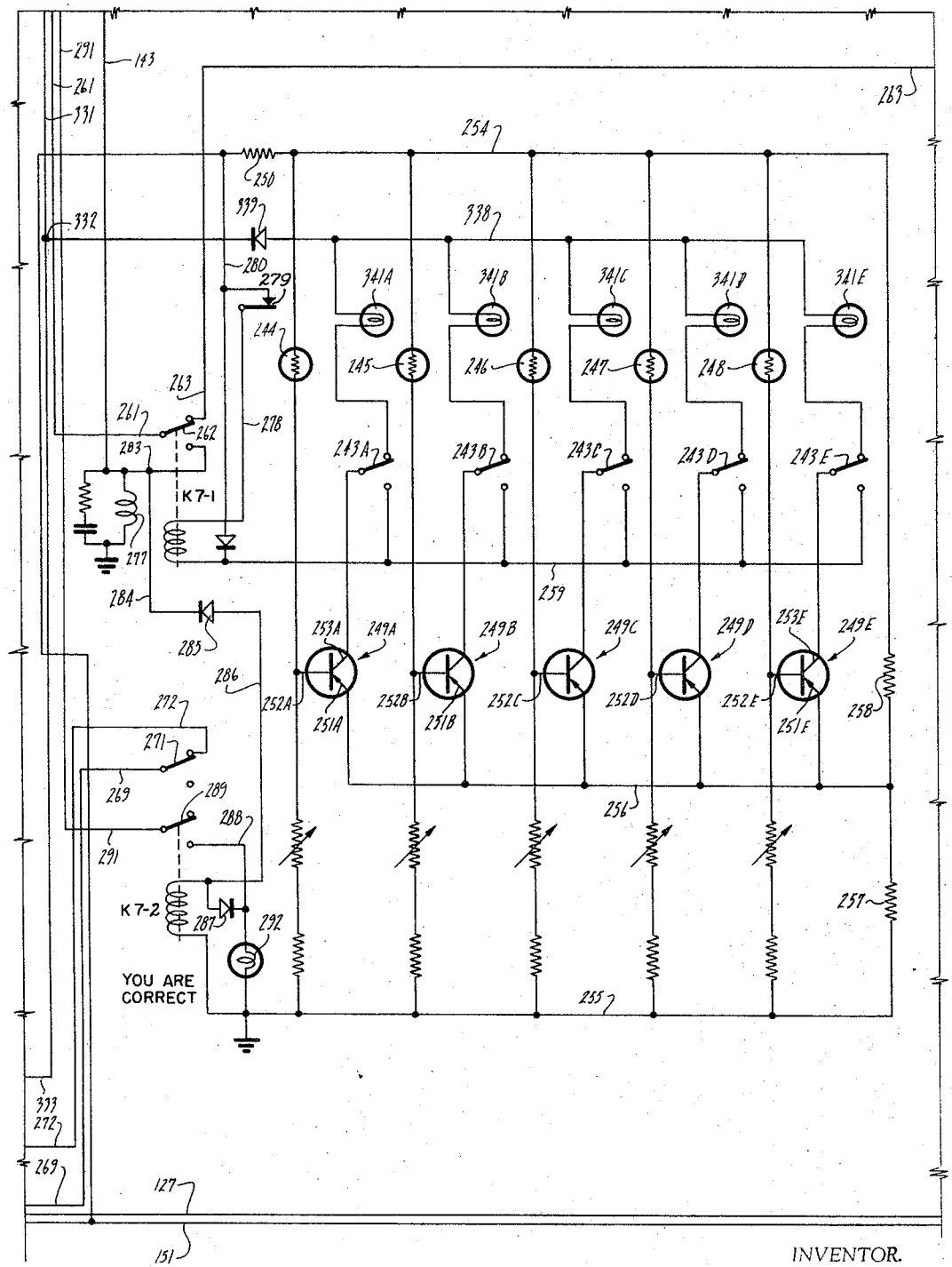

Means for accumulating the score for a plurality of questions is provided in the form of the scoreboard accumulator, A, shown best in FIGURE 4D. The accumulator is operated as noted by a stepping switch SS activated through coil 138. Coil 138 serves to move wipers 281, 282 sequentially whereby each of twenty-two positions 293 receives an A.C. supply voltage for firing a plurality of three neons 294. Each of the three neons fired is disposed in a separate column thereby representing a first, second and third order digit. A.C. line voltage is applied to each position 293 in turn. As is known, neons characteristically fire at a predetermined threshold potential and are extinguished when the potential falls below the threshold.

Wipers 281, 282 receive A.C. via line 295 and a neutral line 296. When, for example, wipers 281, 282 are in their reset position representing a score of 000, the off-normal contacts 297 will be closed to interconnect line 295 to line 298. The topmost neon 294 in each column is disposed to represent a zero digit of its assigned order. These topmost neons 294 are, therefore, fired by the A.C. voltage applied in parallel to each through a single resistor 299, 301, 302, respectively for each of the three orders of numbers. All other neons, while having one side connected directly to neutral line 296 either directly or via leads 303, 304, are disposed to have a smaller voltage applied to them due to the presence of two resistance elements of a greater aggregate value disposed between A.C. supply on line 295 and their other terminal.

The foregoing style of operation is carried throughout the scoreboard accumulator and can be illustrated by the following example assuming an accumulated score of 376 points. In order to accumulate 376 points, wiper 281 will have been moved to position number 8 thereby carrying A.C. supply to line 305. A.C. voltage on line 305 serves to fire neon 306 representing the integer "3" in the third order of digits. Only one resistance element 307 shares the voltage drop between the A.C. supply on line 295 and the neutral line 296. Thus, sufficient voltage lies across neon 306 to ignite it. All other neons in the third order of digits that are connected to line 305, are connected through additional resistors whereby the potential across them is insufficient to cause them to fire. The "seven" neon in the second order of digits is fired via lines 308, 309, the single resistance element 311, neon 312 and conductors 304, 303, 296. Finally, in order to ignite the neon which indicates the integer "6" in the first order of digits, the A.C. via lines 305, 308 passes through the single resistor 313 to fire neon 314, which represents the integer "6."

Means serving to establish a selected level of accumulated score above which a free play of the equipment will be available includes a third wiper arm 315 carried by scoring stepper SS. Arm 315 is rotationally disposed to scan a bank 316 of contacts. Arms 315 and 282 have substantially the same rotational displacement with respect to wiper 281 whereby the eleven contacts scanned by 315 and 282 is achieved simultaneously. If it is assumed that a free play is to be available when the scoring has exceeded a level of "700," the first two switches 317, 318 of four series connected switches 317–320, are opened. Thus, wiper 315 must reach the third contact point in bank 316 in order to control a free play circuit by means of interconnecting the lines 321, and 322.

When lines 321, 322 have been interconnected, free play lamp 323 is energized. This circuit runs from supply voltage VS (cont.) on line 75 to junction point 324, line 325, holding contact 326 of free play relay 78, lines 327, 92, 322, switches 320 and 319 to wiper 315 and lead 321. Lead 321 carries the supply voltage to junction point 328 and, through lamp 323, to ground via line 89.

As will be described further below at the end of the game, when start relay 79 is de-energized a free play button 329 is connected to the same supply voltage that serves to light free play lamp 323. Pressing free play button 329 is entirely ineffectual until after the end of a game or set of questions have been played. At that time start relay 79 is de-energized and depression of button 329 serves to start the reset action and de-energize the free play relay 78. It will be noted further below whereby when the free play relay is de-energized a repeat performance of free play cannot occur again even if the score exceeds the predetermined level established since there is no voltage from free play relay 78 to light free play lamp 323 and energize the rest of the system. Thus free play is limited to one and only one, free play per coin. To restore the free play relay 78 the coin switch must again be operated. Prior to describing in detail the operation of the free play action, however, the means for displaying which of the possible responses was the correct response can now be described.

"Correct answer was" indication

Timed sequencer ST has, by this time, arrived at time ST 27 where supply voltage VS (start) via wiper 162 is applied to a line 331 leading to a junction point 332 with line 333. Application of supply voltage to line 333 serves to energize a lamp 334 disposed beneath a translucent arrow 334A carried by the console panel shown in FIGURE 8.

Application of supply voltage VS (start) to lines 331 and 333 serves to nullify the potential drop across coil K 6–6 and de-energize same via the remainder of the circuit which passes through junction point 335, diode 336, junction points 337, 273, resistance element 231 and subsequently to ground. Thus all the response registering relays K 6–1 through K 6–5 are released to reset the response register. Accordingly, all armature switch members 243A through 243E are reset to couple their respective collector electrodes 253A through 253E to a line 338 now at the potential found at junction point 332. A diode 339 is poled to pass current (current flow theory) from line 338 toward junction point 332. Both the collector and emitter circuit of each transistor 249 are now coupled to an appropriate potential for conduction provided that the base electrode 252 receives proper biasing.

As will be recalled a potential on the order of minus ten volts is carried on line 254. The high impedance of the dark photocells will bias base electrodes at around −¾ v. A substantially greater negative base bias is needed to obtain conduction. Since only one of the five photocells 244–248 will be illuminated and in its low resistance state, the base electrode of that transistor will be properly biased to initiate conduction. Therefore, one of transistors 249 is selected and conducts through the emitter-collector circuit to illuminate its associated lamp 341. The selected lamp 341 stays illuminated throughout times ST 27–30.

When timed sequencer, ST moves at time ST 31 the supply voltage VS is carried onto line 342 to "buck out" the voltage across coil 207 and pass to ground through resistor 208. Therefore, coil 207 becomes de-energized to release its holding contact 217. When 217 is released supply voltage VS (Proj) is de-energized whereby response register K can no longer be operated. At the same time the "you are correct" relay K 7–2 is de-energized by removal of VS (proj) from line 291. Similarly lamp 292 is extinguished.

For reasons which will later appear, during the last timed interval in the cycle at time ST 32, the question count stepper SQ is energized whereby it advances one step upon return of ST wiper 136 to the first position of the sequence.

Thus at time ST 32 line 343 carries supply voltage to junction point 344. This supply voltage is carried on line 345 through diode 264, coil 107 of question count driver relay K 12–1, and to ground via network 113. Energizing coil 107 serves to connect armature 106 to contact point 114 whereby supply voltage from line 345 is carried to coil 109 of SQ. Coil 109 remains energized until ST moves to the next position, i.e., to the beginning of the next question sequence. At that time, coil 109 is de-energized and wipers 115, 116, and 117 take a step.

The above procedure is necessary where a player has scored "235" on the current question in order to cause SQ to advance to the next question.

For example, recall that a "partial reset" of SQ is needed after each question in order to "wash out" any unused scoring contacts from SQ contact banks 118–120, and to set wiper 115 at "325" to begin the next question. Thus, assume that at the end of question No. 1 wiper 115 is contacting the position 395 for "94" points. Wiper 116 is at contact 396. At time ST-zero, line 397 receives VS (start). Line 397 leads to line 104 via diode 398 and energizes coil 109 via armature 106. Interrupter 111, however, energizes relay K 12–1 and coil 109 de-energizes to advance wipers 115, 116, 117 one step.

Stepping continues until contact 399 receives VS (start) and applies it via diode 401 and lines 402, 112 to keep relay K 12–1 energized and SQ coil 109 de-energized. Contact 399 also serves to light lamp 403 via diode 404 to indicate question No. 2 is being presented. This movement is repeated for subsequent questions.

In the event of a "235" score for any of questions Nos. 2–4, line 402 would cause SQ coil 109 to be maintained de-energized without advancing SQ.

At the end of the game, however, the foregoing "partial reset" of SQ carries wiper 117 to contact point 405 to apply an "end of game" signal to line 366 causing start relay 79 to be de-energized through a nullification of voltage thereacross.

This will end the play unless a free play level of score has been achieved.

In the event a correct answer is never obtained, the indication on the question scoreboard panel, QSB (FIG. 1) will proceed as follows. At time ST 8 the "235" will be extinguished and "188" will appear via the circuit of line 266 carrying VS (proj), wiper 115, the "188" lamp and ground line 441. At time ST 14, the "188" will be reduced to "141." At time ST 19 the "141" drops to "94" and at ST 22 the "95 diminishes to "47." Thus, at timhe ST 26 "47" points are showing due to the presence of wiper 115 at contact 412 leading to line 413. Each time the score is reduced a relay K 12–2 is energized by the circuit traced from line 263, junction point 265, lines 345, 406, relay K 12–2 moving its armature 414 to line 415. However, only when wiper 115 has been moved to carry VS (proj) to line 413 does the movement of armature 414 have a functional result. At that time (ST 26) with line 413 hot, the zero points lamp 416 is lighted by the voltage on line 415. The same voltage operates a holding circuit for K 12–2 through the diode 417 until time ST 31 when VS (proj) is removed from line 266.

*Free play*

Means serving to provide a subsequent free play of the game in response to achievement of a selected predetermined level of accumulated score, is operated as follows.

Recall that scoring wiper 315 serves to couple lines 321 and 322 via series-connected switches 317–320. If it is desired to select "700" as the scoring level for a free play, then switch 318 is opened. Wiper 315 is arranged to sense its associated bank 316 of contacts simultaneously with movement of wiper 282 through its bank of contacts. The latter contacts represent scores from "517" through "940" taken in multiples of 47 points per contact. Thus, lines 321 and 322 are interconnected when a score of "705" has been registered, i.e., the "700" level has been exceeded.

Free play lamp 323 now lights up and junction point 328 is at VS from a circuit traced along line 321, wiper 315, line 322, 92, 327, holding armature 326 of free play relay 78, line 325, junction 324 to VS (cont.) carried on line 75. Between junction point 328 and free play push button 329, means in the form of start relay armature 153 are provided to preclude the player from wasting a free play in the event push button 329 should be pushed prior to the end of the game. Prior closure of button 329 is therefore ineffectual so long as start relay 79 is energized.

To de-energize start relay 79 at the end of the last (e.g., fourth) question in SQ, an "end of game" line 366 leads from the final contact point of bank 120. When wiper 117, carrying VS (start) reaches this contact, a circuit is completed to ground to de-energize start relay 79. This circuit is traced from wiper 117, line 366 to a junction point 367 through resistor 148, lines 88, 89, to ground. Resistor 148 causes the voltage at 367 to approximate the voltage on line 146. Therefore, with virtually no voltage across coil 79 the latter releases armature 153 to condition free play button 329 to be able to reset the system and start a new game without a coin.

Release of armature 153 also places the system in condition to limit the award of free games to a given number per coin, as well as to account for the number of free games played. Closing push button 329 brings VS from point 328 to a junction point 368. From 368 VS is carried through the diode 369 in line 370 to the reset line 84. Rest-relay 77 is energized and the cycle of another game commences.

Supply voltage, VS, at point 368 also serves to buck out the voltage drop across free play relay 78 but not before a short time delay which permits reset relay 77 to have become energized. Junction point 368 is sensed on line 371 through a selection switch 372, a diode 373, and resistor 374 whereby relay 78 is de-energized. The circuit for energizing reset relay 77 includes armature 326 of free play relay 78. Thus, the charging time and capacity of condenser 375 is relatively large whereby relay 78 remains energized for a short period of time sufficient to enable reset relay 77 to set up its holding circuit through armature member 97.

If it is desired to permit an unrestricted number of free plays on a single coin, dependent solely upon the successive achievement of a qualifying score, switch 372 is manually conditioned to its "unrestricted" position. Otherwise, one and only one free play will be permitted for each coin deposited. It can of course be arranged by inserting suitable counting mechanism in the circuit of line 371 to close switch 372 to the restricted position after a predetermined number of free games have been performed on one coin thereby limiting the number of free games to a selected number.

Recall that the coin used in the beginning served to energize free play relay 78 and that it was held energized by armature 326. In a "free play" situation, when reset line 84 receives supply voltage VS from junction point 328, free play relay 78 is not energized. Thus, although the circuit between 321 and 322 may again be connected by wiper 315 at a selected level of points scored, armature 326 is in open circuit (de-energized) condition to preclude further application of supply voltage to junction 328.

The number of free plays performed by the equipment can be recorded for purposes of giving indication as to the appropriateness of the selected qualifying level of score necessary to achieve a free play. A counter is operated through coil 376 whenever VS is applied to junction point 368 responsive to depressing push button 329.

Figure 4G:
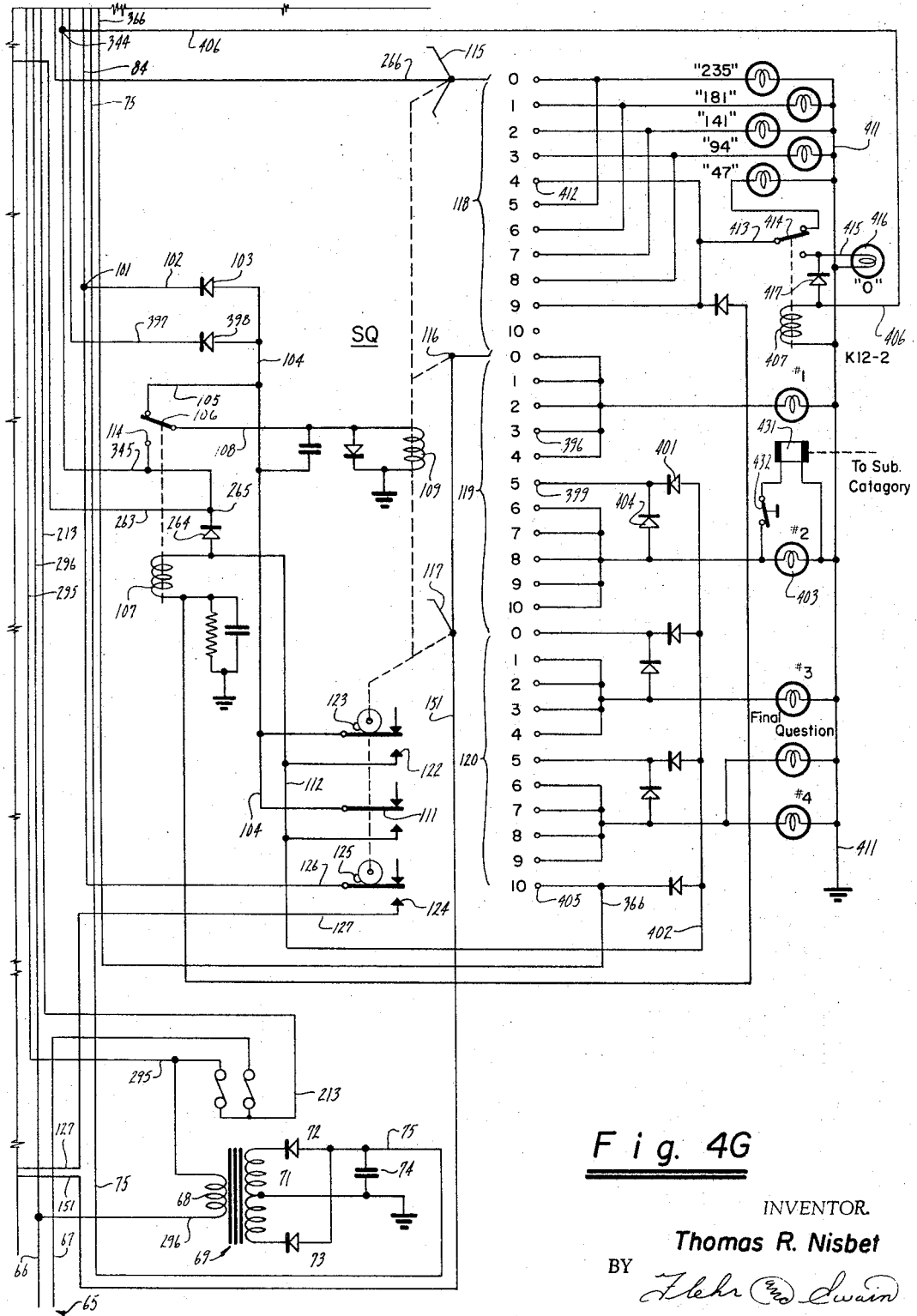

For purposes of utilizing the instructional apparatus to advertise products or conduct market survey studies means are provided whereby one question in each set of questions can be automatically taken from a given category. For example, one category can relate to questions about a single product or a general class of merchandise. Thus, the system includes means selectively operable during the presentation of a selected group of questions which serves to automatically interject a question from another category. In FIGURE 4G a relay 431 is disposed in parallel with the question No. 2 lamp 403. A settable switch 432 is selectively positionable to incorporate relay 431 in the system when the advertising feature is to be used. The armature of relay 431 operates a given one of the manually settable switches 203 (in FIG. 4A). Thus, the second question in each group of questions presented will be automatically taken from a predetermined category.

What is claimed is:

1. In instructional apparatus, in combination, means for presenting one of a plurality of questions to a player, a response register for selectively registering one of a plurality of responses entered by the player, means for interrogating the condition of the register and determining correct and incorrect player responses, means responsive to said interrogating means for indicating a correct player response to the question presented, means operatively coupled to said interrogating means serving to indicate the award of a score for a correct response to the question presented, the last said means serving to diminish said score with increasing elapsed time between presenting the question and indication of a correct response, means serving to selectively permit said registered response when incorrect to be changed a predetermined number of times with a commensurate reduction in said score whereby said score diminishes by both the number of attempted responses and the elapsed time prior to registering a correct response, and means serving to activate each said means according to a predetermined sequence at established time intervals.

2. In instructional apparatus wherein questions are presented and responses thereto are registered, the combination of means for presenting to a player a predetermined number of randomly selected questions, a medium utilized by said means and disposed to be advanced through same, said medium having questions recorded thereon at predetermined increments of displacement, motive means for advancing said medium, randomizing means operably coupled to said motive means for advancing said medium an unpredictable degree of displacement prior to presentation of each question whereby the questions are taken from said medium and automatically presented in a random non-recurring sequence.

3. Apparatus as defined in claim 2 wherein the last named means includes a fixed sequence of contacts for stepping the first named means a variable number of increments of displacement, sensing means serving to energize said motive means via said contacts, and means for advancing the sensing means through the sequence of contacts in unpredictable degree once for the presentation of each question.

4. Apparatus as defined in claim 2 wherein said medium includes questions recorded thereon pertaining to a plurality of categories and further includes means associated with the first named means serving to limit questions presented to those of a selected category.

5. Apparatus as defined in claim 4 further including means selectively operable to automatically interject a question for presentation from a predetermined category different from said selected category.

6. In instructional apparatus, the combination of means for presenting one of a plurality of questions to a player, a response register for selectively registering one of a plurality of possible responses entered by the player, means for interrogating the condition of the register and determining correct and incorrect player responses, means serving to activate each said means according to a predetermined sequence at established time intervals, means serving to selectively permit an incorrect registered response to be automatically registered, determined and changed a predetermined number of times before presentation of a succeeding question, and means responsive to registering a response and serving to temporarily reduce the duration of said established time intervals for a predetermined period of said sequence.

7. Apparatus as defined in claim 6 further including means terminating said predetermined period when said registered response is determined to be incorrect.

References Cited by the Examiner

UNITED STATES PATENTS

| | | | |
|---|---|---|---|
| 2,826,828 | 3/1958 | Hamilton | 35—9 |
| 2,835,052 | 5/1958 | Raich et al. | 35—9 |
| 2,877,568 | 3/1959 | Besnard et al. | 35—9 |
| 3,121,595 | 2/1959 | Uttal | 35—9 |
| 3,123,920 | 3/1964 | Crowner et al. | 35—9 |
| 3,141,243 | 7/1964 | Chapman et al. | 35—9 |
| 3,154,862 | 11/1964 | Culpepper | 35—9 |

EUGENE R. CAPOZIO, *Primary Examiner.*

S. M. BENDER, W. W. NIELSEN, *Assistant Examiners.*